US008060611B2

(12) United States Patent
Aoki

(10) Patent No.: US 8,060,611 B2
(45) Date of Patent: Nov. 15, 2011

(54) CONTENT PROVIDING SYSTEM FOR ENABLING A USER TO CHANGE DESTINATION OF CONTENTS

(75) Inventor: Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 918 days.

(21) Appl. No.: 11/341,640

(22) Filed: Jan. 30, 2006

(65) Prior Publication Data

US 2006/0170963 A1      Aug. 3, 2006

(30) Foreign Application Priority Data

Jan. 31, 2005     (JP) ................... 2005-023952

(51) Int. Cl.
  *G06F 3/12*   (2006.01)
(52) U.S. Cl. ........ 709/226; 358/1.1; 358/1.15; 709/217; 709/219; 709/203; 709/238; 709/239
(58) Field of Classification Search ................ 709/226, 709/203, 217, 219, 238, 239; 358/1.1, 1.15
  See application file for complete search history.

(56) References Cited

U.S. PATENT DOCUMENTS

| | | | |
|---|---|---|---|
| 6,157,945 A | | 12/2000 | Balma et al. |
| 6,990,497 B2 * | | 1/2006 | O'Rourke et al. ............ 1/1 |
| 7,298,709 B2 | | 11/2007 | Watanabe |
| 2002/0013835 A1 * | | 1/2002 | Umezu et al. ............ 709/223 |
| 2002/0062372 A1 * | | 5/2002 | Hong et al. ............ 709/225 |
| 2002/0073232 A1 * | | 6/2002 | Hong et al. ............ 709/238 |
| 2003/0002481 A1 * | | 1/2003 | Laursen et al. ............ 370/352 |
| 2003/0069686 A1 * | | 4/2003 | Watanabe et al. ............ 701/200 |
| 2003/0146977 A1 * | | 8/2003 | Vale et al. ............ 348/207.1 |
| 2003/0149886 A1 * | | 8/2003 | Ito et al. ............ 713/193 |

(Continued)

FOREIGN PATENT DOCUMENTS

EP     1100244 A2     5/2001

(Continued)

OTHER PUBLICATIONS

Bellavista et al., Integrated Support for Handoff Management and Context Awareness in Heterogeneous Wireless Networks., Proceedings of the 3rd international workshop on Middleware for pervasive and ad-hoc computing., ACM International Conference Proceeding Series; vol. 115., New York, NY., USA., 2005.*

Japanese Patent Office, Notification of Reasons of Rejection for Patent Application No. JP2005-023952, dispatched Nov. 11, 2008.

*Primary Examiner* — Wing Chan
*Assistant Examiner* — Kostas Katsikis
(74) *Attorney, Agent, or Firm* — Baker Botts L.L.P.

(57) ABSTRACT

A server for providing content, including a registration unit that stores first destination information representing a first destination in a memory, if the registration unit receives a command for registration accompanied by the first destination information, a content providing unit that provides content to a client device corresponding to the first destination stored in the memory, and a switched content providing unit that operates to switch offering of content by the content providing unit from the first destination to a second destination for a predetermined time period if the switched content providing unit receives a command for switching accompanied by second destination information representing the second destination, to provide content to a client device corresponding to the second destination, and to switch offering of content from the client device corresponding to the second destination information if the predetermined time period has elapsed back to the first destination.

13 Claims, 16 Drawing Sheets

U.S. PATENT DOCUMENTS

| | | | |
|---|---|---|---|
| 2003/0156589 A1* | 8/2003 | Suetsugu | 370/396 |
| 2003/0200061 A1* | 10/2003 | Yamanaka et al. | 702/188 |
| 2004/0003291 A1* | 1/2004 | Futa et al. | 713/201 |
| 2004/0192299 A1* | 9/2004 | Wilson et al. | 455/433 |
| 2004/0252051 A1* | 12/2004 | Johnson | 342/357.09 |
| 2004/0264439 A1* | 12/2004 | Doherty et al. | 370/352 |
| 2005/0002639 A1* | 1/2005 | Putterman et al. | 386/46 |
| 2005/0057538 A1* | 3/2005 | Morse et al. | 345/204 |
| 2006/0107010 A1* | 5/2006 | Hirezaki et al. | 711/165 |
| 2006/0167956 A1* | 7/2006 | Chasen et al. | 707/203 |
| 2006/0168222 A1* | 7/2006 | Saxena | 709/225 |
| 2009/0152170 A1* | 6/2009 | Kulprathipanja et al. | 208/310 Z |

FOREIGN PATENT DOCUMENTS

| | | |
|---|---|---|
| JP | 5328080 | 12/1993 |
| JP | 2000-041063 A | 2/2000 |
| JP | 2000-101744 A | 4/2000 |
| JP | 2001-211481 A | 8/2001 |
| JP | 2003-067303 A | 3/2003 |
| JP | 2003-242059 A | 8/2003 |
| JP | 2003-274109 A | 9/2003 |
| JP | 2004007222 A * | 1/2004 |

* cited by examiner (DESTINATION INFORMATION)

| RECEIVING WAY | printer/facsimile/mail/web |
|---|---|
| DESTINATION ADDRESS | IP address/phone number/mail address/none |
| RECEPTION CHECK MODE | automatic/manual |
| EXPIRATION DATE | year, month, day, hour, minute, second /indefinite duration |

FIG.4A (REGULAR DESTINATION INFORMATION)

| RECEIVING WAY | printer/facsimile/mail/web |
|---|---|
| DESTINATION ADDRESS | IP address/phone number |
| RECEPTION CHECK MODE | automatic/manual |

FIG.4B (DESTINATION SETTING INFORMATION)

| RECEIVING WAY | printer/facsimile/mail/web |
|---|---|
| DESTINATION ADDRESS | IP address/phone number/mail address/URL |
| RECEPTION CHECK MODE | automatic/manual |
| EXPIRATION DATE | year, month, day, hour, minute, second /indefinite duration |

FIG.4C (MANAGEMENT TABLE)

| CONTENT ID | FILE NAME | TRANSMISSION HISTORY INFORMATION | RECEPTION CONFIRMATION INFORMATION |
|---|---|---|---|
| ***** | file1 | TRUE | TRUE |
| ***** | file2 | TRUE | TRUE |
| ***** | file3 | TRUE | FALSE |
| ***** | file4 | FALSE | FALSE |
| ***** | file5 | FALSE | FALSE |
| ⋮ | ⋮ | ⋮ | ⋮ |

FIG. 5

CONTENT PROVIDING SYSTEM FOR ENABLING A USER TO CHANGE DESTINATION OF CONTENTS

CROSS-REFERENCE TO RELATED APPLICATION

This application claims priority under 35 U.S.C. §119 from Japanese Patent Application No. 2005-023952, filed on Jan. 31, 2005. The entire subject matter of the application is incorporated herein by reference.

BACKGROUND

1. Technical Field

Aspects of the present invention relate to a content providing system in which contents are provided from a server to a client device.

2. Description of Related Art

A content providing system, configured to provide contents from a server to a client device which is registered in the server by a user, is widely used. In such a system, various types of current information such as news and weather information are provided intermittently (at regular or irregular intervals) to the client device as the contents.

Various types of devices such as a mobile phone, a personal computer, a network printer, and a facsimile device (supporting network communication) can be used as the client device in the content providing system. The contents are displayed on a display unit of the client device if the client device is the mobile phone or the personal computer, while the contents are printed on recording medium if the client device is the network printer or the facsimile device. The contents may be provided to the client device (e.g. the personal computer) in a form of an electronic mail.

If a user travels to a place different from a place where the user usually uses a regular client device (e.g., a printer or a facsimile device), the user is required to operate the regular client device to access the system and to change a destination of the contents so as to continue receiving the contents at the place where the user is staying during his/her travel. That is, the user is required to input a new address (e.g., an IP address or a phone number), at which the user is able to receive the contents at the place where the user is staying during his/her travel, to the server to change the destination of the contents.

Such a configuration of the content providing system has a drawback that the user needs to change the destination of contents back to the user's regular client device after the user returns from travel, which is very troublesome for the user.

In Japanese Patent Provisional Publication No. HEI 5-328080 (hereafter referred to as JP HEI 5-328080), a facsimile device configured to have a transferring function is disclosed. By using the transferring function of a facsimile device which the user usually uses, the user is able to receive the contents on another facsimile device set as a transferring target to the facsimile device which the user usually uses. However, there is a problem that the facsimile device increases the load on a network and therefore increases the communication cost.

SUMMARY

Aspects of the present invention are advantageous in that a content providing system, which enables a user of a client device to change temporarily a destination of contents without requiring the user to conduct trouble some operations, is provided.

BRIEF DESCRIPTION OF THE ACCOMPANYING DRAWINGS

FIG. 4A illustrates a data structure of destination information added to a registration command or a setting switch command according to illustrative aspects of the invention.

FIG. 4B illustrates a data structure of regular destination information forming user information according to illustrative aspects of the invention.

FIG. 4C illustrates destination setting information forming the user information according to illustrative aspects of the invention.

FIG. 5 illustrates a data structure of a management table according to illustrative aspects of the invention.

DETAILED DESCRIPTION

General Overview

Figure 1:
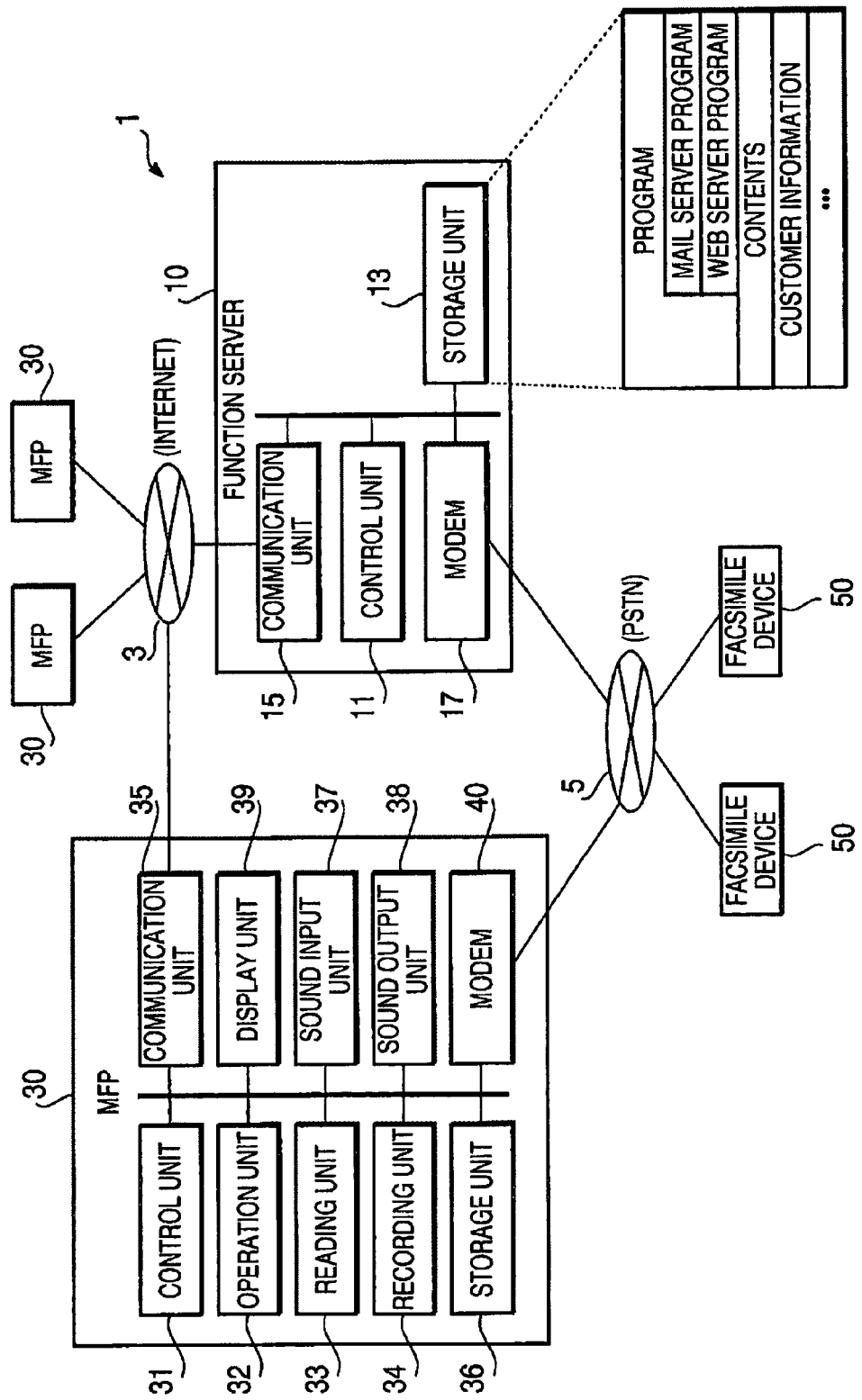
FIG. 1 shows a block diagram of a content providing system according to illustrative aspects of the invention.

According to an aspect of the invention, there is provided a server for providing contents, which is provided with a registration unit that stores first destination information representing a destination of offering of contents in a memory, as a regular destination of contents, if the registration unit receives a command for registration accompanied by the first destination information, a content providing unit that provides contents to a client device corresponding the regular destination stored in the memory, and a switched content providing unit that operates to stop offering of contents by the content providing unit for a predetermined time period if the switched content providing unit receives a command for switching accompanied by second destination information representing a destination of offering of contents, to provide contents to a client device corresponding to the second destination information, to stop offering of contents to the client device corresponding to the second destination information if the predetermined time period has elapsed, and to restart the offering of contents by the content providing unit.

With this configuration, the user of the client device is able to change temporarily a destination of contents from the regular destination device to another device. The user is not required to change the destination of contents from a device, which the user uses at a place where the user is staying during his/her travel, back to the user's regular destination device.

Optionally, if the switched content providing unit receives the command for switching, the switched content providing unit may operate to stop offering of contents by the content providing unit, and to provide contents to the client device corresponding to the second destination information until the switched content providing unit receives a command for releasing. Further, if the switched content providing unit receives the command for releasing, the switched content providing unit may operate to stop offering of contents to the client device corresponding to the second destination information, and to restart the offering of contents by the content providing unit.

Since the switched content providing unit changes the destination of contents back to the regular destination, the user is not required to input address information of the regular destination device. The user is only required to input the command for releasing to change the destination of contents back to the regular destination device.

Still optionally, if the switched content providing unit receives the command for switching, the switched content providing unit may operate to stop offering of contents by the content providing unit, and to provide contents to the client device corresponding to the second destination information until a predetermined time is reached. Further, if the predetermined time is reached, the switched content providing unit may operate to stop offering of contents to the client device corresponding to the second destination information, and to restart the offering of contents by the content providing unit.

Since the destination of contents is changed back to the regular destination device automatically by the switched content providing unit, the user is not required to input address information of the regular destination device.

Still optionally, the command for switching may be accompanied by a switch end time defined by a source device of the command for switching. If the switched content providing unit receives the command for switching, the switched content providing unit may operate to stop offering of contents by the content providing unit, and to provide contents to the client device corresponding to the second destination information until the switch end time is reached. Further, if the switch end time is reached, the switched content providing unit may operate to stop offering of contents to the client device corresponding to the second destination information, and to restart the offering of contents by the content providing unit.

With this configuration, the destination of contents is automatically changed back to the regular destination device when the switch end time is reached, without requiring the user to conduct a user operation.

Still optionally, the server may include a conversion unit that converts a data format of contents to a format acceptable to a target client device which receives the contents from the server.

Since the format of contents is changed in accordance with the type of the client device, the user is able to receive contents on various types of devices during his/her travel.

Still optionally, the conversion unit may convert the contents into print data for a printing device if the target client device is the printing device.

Still optionally, the conversion unit may convert the contents into facsimile data for a facsimile device if the target client device is the facsimile device.

According to another aspect of the invention, there is provided a system for providing contents, which is provided with the server mentioned above, and at least one client device that receives contents from the server.

With this configuration, the user of the client device is able to change temporarily a destination of contents from the regular destination device to another device. The user is not required to change the destination of contents from a device, which the user uses at a place where the user is staying during his/her travel, back to the user's regular destination device.

Optionally, the server may include a judgment unit that judges whether it is necessary to provide each content item, which the switched content providing unit has provided to the client device, to the client device corresponding to the regular destination. In this case, the content providing unit may operate to provide newly generated contents, not provided by the switched content providing unit, to the client device corresponding to the regular destination after restarted by the switched content providing unit, and to provide the contents, which the judgment unit judged that it is necessary to provide the contents to the client device corresponding to the regular destination, to the client device corresponding to the regular destination.

With this configuration, the user is able to receive contents, which is the same as the contents provided to a device used before the user moves to a travel destination, on another device which the user uses at a place where the user is staying during his/her travel.

Still optionally, the system may include an obtaining unit that obtains necessity information indicating whether it is necessary to provide each content item, which the switched content providing unit has provided to the client device, to the client device corresponding to the regular destination, from an operation unit which a user is able to operate. In this case, the judgment unit may judge whether it is necessary to provide each content item, which the switched content providing unit has provided to the client device, to the client device corresponding to the regular destination, in accordance with the necessity information obtained by the obtaining unit.

With this configuration, it is possible to provide only contents required by the user to the regular destination device.

Still optionally, the server may include a judgment unit that judges whether it is necessary to provide contents, which the switched content providing unit has provided to the client device corresponding to the second destination information, to a client device corresponding to third destination information representing a destination of offering of contents accompanying a command for switching which is newly received while the switched content providing unit stops offering of contents by the content providing unit. If the switched content providing unit receives the new command for switching while the switched content providing unit stops offering of contents by the content providing unit, the switched content providing unit may operate: to stop an operation thereof based on the command for switching already received; to provide contents, which the judgment unit judges that it is necessary to provide the contents to the client device corresponding to the third destination information accompanying the newly received command for switching, to the client device corresponding to the third destination information; to provide contents, newly generated after receiving the new command for switching, to the client device corresponding to the third destination information in place of the content providing unit during a certain time period from stoppage of the operation thereof; to stop offering of contents when the certain time period has elapsed; and to restart offering of contents by the content providing unit.

With this configuration, the user is able to receive contents, which is the same as the contents provided to a device used before the user moves to a travel destination, on another device which the user uses at a place where the user is staying during his/her travel.

Still optionally, the system may include an obtaining unit that obtains necessity information indicating whether it is necessary to provide each content item, which the switched content providing unit has provided to the client device, to the client device corresponding to the third destination information, from an operation unit which a user is able to operate. In this case, the judgment unit may judge whether it is necessary to provide each content item, which the switched content providing unit has provided to the client device corresponding to the second destination information, to the client device corresponding to the third destination information, in accordance with the necessity information obtained by the obtaining unit, if the new command for switching is received while the switched content providing unit stops offering of contents by the content providing unit.

With this configuration, it is possible to provide only contents required by the user to the regular destination device.

Still optionally, the at least one client device may be configured to transmit the command for registration and the command for switching, to the server, and to transmit information representing its own device as the destination of contents to the server when transmitting the command for registration.

According to another aspect of the invention, there is provided a method for providing contents. The method includes the steps of storing first destination information representing a destination of offering of contents in a memory, as a regular destination of contents, if a command for registration accompanied by the first destination information is received, providing contents to a client device corresponding the regular destination stored in the memory, stopping offering of contents to the client device corresponding to the regular destination for a predetermined time period if a command for switching accompanied by second destination information representing a destination of offering of contents is received, providing contents to a client device corresponding to the second destination information, stopping offering of contents to the client device corresponding to the second destination information if the predetermined time period has elapsed, and restarting the offering of contents to the client device corresponding to the regular destination.

With this configuration, the user of the client device is able to change temporarily a destination of contents from the regular destination device to another device. The user is not required to change the destination of contents from a device, which the user uses at a place where the user is staying during his/her travel, back to the user's regular destination device.

Illustrative Embodiments

Hereafter, an illustrative embodiment will be described with reference to the accompanying drawings.

FIG. 1 shows a block diagram of a content providing system 1 according to an embodiment. As shown in FIG. 1, the content providing system 1 includes a function server 10 capable of providing various types of services, more than one client devices (digital multifunction peripherals (MFPs) 30 and facsimile devices 50 in this embodiment). The function server 10, MFPs 30 and facsimile devices 50 are connected to each other via networks and are capable of conducting bi-directional communications with respect to each other. Since the MFPs 30 have the same configuration, only one of the MFPs 30 is explained in the followings.

The MFP 30 is capable of conducting bi-directional communications with the function server 10 via the Internet 3. Each facsimile device 50 is capable of conducting bidirectional communications with the function server 10 via a PSTN (public switched telephone network) 5. The MFP 30 has the scanner function, the printing function, the copying function, and the facsimile function, and is capable of receiving print data from the function server 10 via the Internet 3 and printing out images according to the print data on recording medium.

More specifically, the MFP 30 includes a control unit 31, an operation unit 32, a reading unit 33, a recording unit 34, a communication unit 35, a storage unit 36, a sound input unit 37, a sound output unit 38 and a modem 40. The control unit 31 includes a CPU, a ROM and a RAM (not shown in FIG. 1), and the CPU executes programs stored in the ROM so as to control operations of the MFP 30.

The reading unit 33 functioning as a scanner reads an image formed on (printed on) an original and generates image data corresponding to the read image. The recording unit 34 functioning as a printer forms an image on a sheet in accordance with image data. The communication unit 35 conducts data processing for the data communications with a node (e.g., the function server 10).

The storage unit 36 includes a non-volatile RAM in which various types of data is stored. The sound input unit 37 includes a microphone installed in a handset (not shown) of the MFP 30. The sound input unit 37 generates sound data (e.g. PCM data) representing the sound obtained by the microphone. The sound output unit 38 outputs sound via a speaker installed in the handset or a speaker installed in a main body of the MFP 30. The modem 40 is connected to the PSTN 5 to conduct voice communications and facsimile communications with devices (e.g. the facsimile device 50)

The function server 10 includes a control unit 11, a storage unit 13, a communication unit 15 and a modem 17. The function server 10 is capable of executing processes for providing contents in accordance with customer information stored in the storage unit 13 so as to provide contents to a client device (e.g., the MFP 30 or the facsimile device 50). The control unit 11 includes a CPU, a Rom and a RAM (not shown in FIG. 1), and the CPU executes programs stored in the ROM so as to control operations of the function server 10. The communication unit 15 operates to communicate with external devices using an IP protocol via the Internet 3. The modem 17 is connected to the PSTN 5 and operates to conduct voice communications or facsimile communications with external devices via the PSTN 5. The control unit 13 includes a hard disk drive in which various types of data including programs, contents and customer information are stored.

More specifically, in the storage unit 13, programs for a registration process (see FIG. 3), a content registration process (see FIG. 6), a destination setting process (see FIG. 7), an automatic setting change process (see FIG. 8), a content providing process (see FIG. 9), a data transmission process (FIG. 10), a reception confirmation information update process (see FIG. 12) are stored. Further, in the storage unit 13, a mail sever program enabling the function server 10 to function as a mail server (e.g., a SMTP server and a POP server), and a web server program enabling the function server 10 to function as a web server are stored. The contents stored in the storage unit 13 include topics such as news and weather information.

Figure 2:
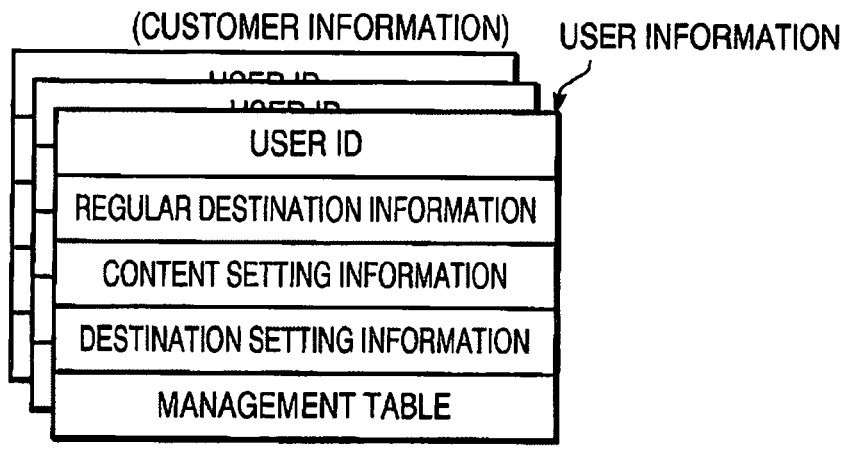
FIG. 2 illustrates a data structure of customer information according to illustrative aspects of the invention.

The customer information stored in the storage unit 13 includes one or more pieces of user information respectively corresponding to users, as shown in FIG. 2. Each piece of user information includes a user ID, regular destination information representing a regular destination for transmission of contents, content setting information representing the type of contents which a user wants to receive, destination setting information representing a destination for transmission of contents, a management table representing a list of transmission target contents to be provided for the user are stored.

FIG. 2 illustrates a data structure of the customer information. User information forming the customer information is generated each time the function server 10 receives a registration command from the client device (the function server 30 or the facsimile device 50) which the user is able to operate (e.g., owned by the user) and which is configured to be capable of transmitting the registration command.

Figure 3:
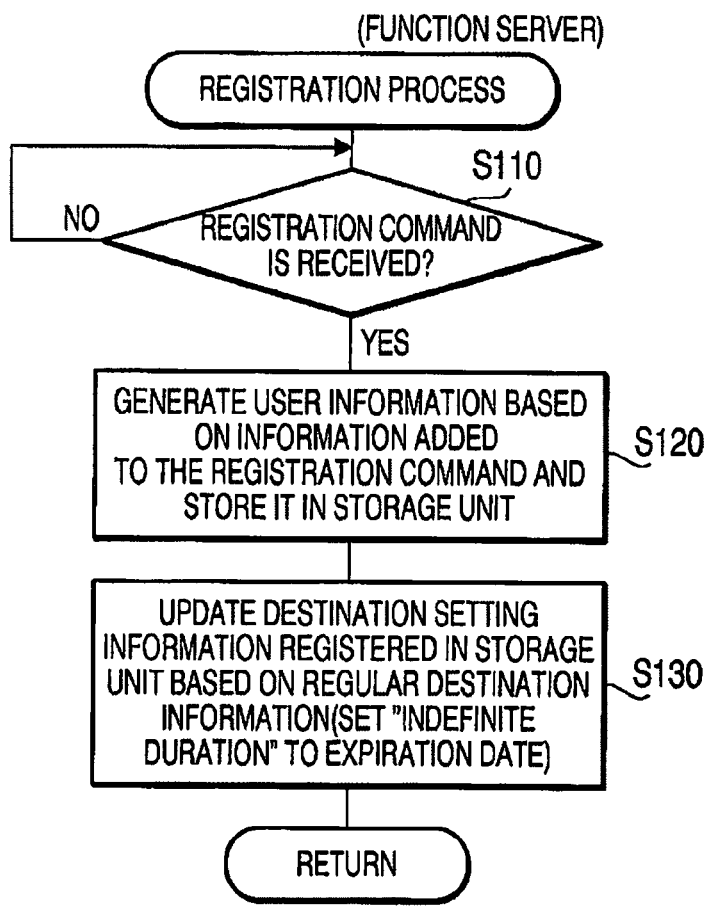
FIG. 3 is a flowchart illustrating a registration process executed by a function server provided in the content providing system according to illustrative aspects of the invention.

FIG. 3 is a flowchart illustrating the registration process executed under control of the control unit 11 of the function server 10. The registration process is executed repeatedly by the function server 10.

First, the control unit 11 waits until a registration command is transmitted from a client device (e.g., the MFP 30 or the facsimile device 50). If the registration command is received (S110: YES), the control unit 11 generates user information based on a user ID, content setting information, and destination information added to the registration command, and stores the user information in the storage unit 13 (S120). FIG. 4A illustrates a data structure of the destination information added to the registration command or a setting switch command (which will be described later). FIG. 4B illustrates a data structure of the regular destination information forming the user information. FIG. 4C illustrates the destination setting information forming the user information.

As shown in FIG. 4A, the destination information includes a parameter representing a receiving way, a parameter representing a destination address, a parameter representing a reception check mode, and a parameter representing an expiration date regarding a destination. One of items "printer", "facsimile", "mail" and "web" is set as the parameter of the receiving way. On of an IP address, a phone number, a mail address and null is set as the parameter of the destination address. One of "auto" and "manual" is set as the parameter of the reception check mode. One of a time ("year, month, day, hour, minute, second") and "indefinite duration" is set as the parameter of the expiration date.

In step S120, the control unit 11 extracts the parameters of the receiving way, the destination address and the reception check mode, from the destination information added to the registration command, and generates the regular destination information in which those parameters are arranged.

As shown in FIG. 4B, the regular destination information includes a parameter representing a receiving way, a parameter representing a destination address and a parameter representing a reception check mode. Because in this embodiment the MFP 30 and the facsimile device 50 function as the client device, one of "printer" and "facsimile" is set as the parameter representing the receiving way added to the registration command or contained in the regular destination information.

After generating the regular destination information, the control unit 11 generates user management information in which the regular destination information, the user ID and the content setting information added to the registration command, empty destination setting information, and empty management table are arranged, so that the user registration is attained.

After finishing step S120, the control unit 11 updates the destination setting information registered in the storage unit 13 based on the regular destination information of the user (S130). As shown in FIG. 4C, the destination setting information includes a parameter representing a receiving way, a parameter representing a reception check mode, and a parameter representing an expiration date regarding the destination.

Specifically, in step S130, the control unit 11 assigns the parameter representing the receiving way of the regular destination information to the parameter representing the receiving way of the destination setting information, assigns the parameter representing the destination address of the regular destination information to the parameter representing the destination address of the destination setting information, and assigns the parameter representing the reception check mode of the regular destination information to the parameter representing the reception check mode of the destination setting information. Further, the control unit 11 assigns a value representing indefinite duration to the parameter representing the expiration date regarding the destination.

Then, the control unit 11 terminates the registration process, and afterward the control unit executes step S110 to wait for a next registration command.

Figure 6:
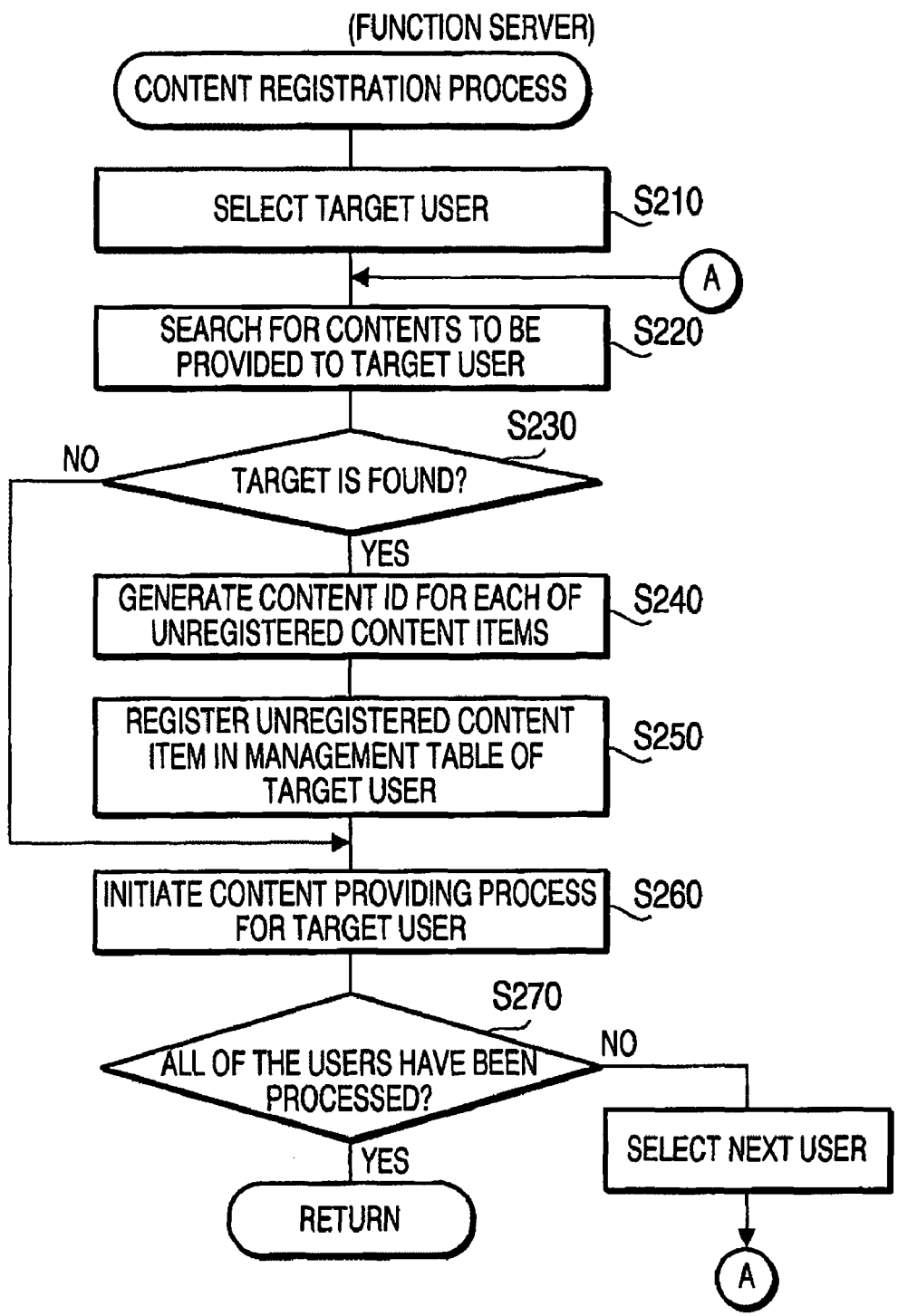
FIG. 6 is a flowchart illustrating a content registration process executed by the function server according to illustrative aspects of the invention.

The management table which is generated as null data in the user registration process is updated in the content registration process. FIG. 5 illustrates a data structure of the management table. FIG. 6 is a flowchart illustrating the content registration process executed under control of the control unit 11 of the function server 10. The content registration process is executed repeatedly by the function server 10.

As shown in FIG. 5, the management table includes one or more pieces of content management information respectively prepared for one or more content items. Each piece of content management information includes a content ID serving as an identification of each content item, a data file name of each content item, transmission history information representing presence or absence of a transmission history of each content item, and reception confirmation information.

The content registration process is executed as follows. First, the control unit 11 selects one of users located at the top in the customer information, as a target user, and reads the selected user's user information from the customer information (S210). Then, the control unit 11 searches contents stored in the storage unit 13 for contents which is to be provided to the target user and is not yet registered in the management table of the target user, based on the content setting information contained in the target user's user information (S220).

If unregistered contents are found (S230: YES), the control unit 11 generates a unique content ID for each of one or more unregistered content items (S240). Then, the control unit 11 generates content management information, containing the generated content ID, a data file name of the corresponding contents, transmission history information and reception confirmation information (both of which are set as "FALSE"), for each of the found unregistered content items, so that the contents to be provided to the target user are registered in the management table (S250).

Next, the control unit 11 initiates the content providing process for the target user (S260). As described in detail later, the control unit 11 transmits the contents, which are associated with the transmission history information having the value of "FALSE" in the content management information of the target user's user management information, to a destination indicated by the destination setting information of the target user. It should be noted that transmission history information of "FALSE" indicates that the corresponding contents have not yet been transmitted from the function server 10 to the target user, while the transmission history information of "TRUE" indicates that the corresponding contents have already transmitted from the function server 10 to the target user. The reception confirmation information of "FALSE" indicates that reception of the corresponding contents are not confirmed by a user, and therefore re-transmission of the contents is necessary, while the reception confirmation information of "TRUE" indicates that re-transmission of the corresponding contents are not necessary.

After step S260 is processed, the control unit 11 judges whether all of the users registered in the customer information have been processed (S270). If all of the users have not been processed (S270: NO), the control unit 11 selects one of unprocessed users (a next user), as a target user (S280). Then, control returns to step S220. If all of the users have been processed (S270: YES), the content registration process terminates.

In this embodiment, the reception confirmation information is used as one of items of the content management information because the function server 10 is configured to change a destination of contents according to information of a user's operation and therefore a possibility, that the contents are not delivered to the user, arises. The function server 10 is able to judge whether a user needs to receive contents, which is the same as the contents provided to a pre-switching client device (previously set by the user as a client device to be supplied with the contents), on a post-switching client device (newly set by the user as a client device to be supplied with the contents), based on the reception confirmation information so that the contents are provided to the user again.

Figure 7:
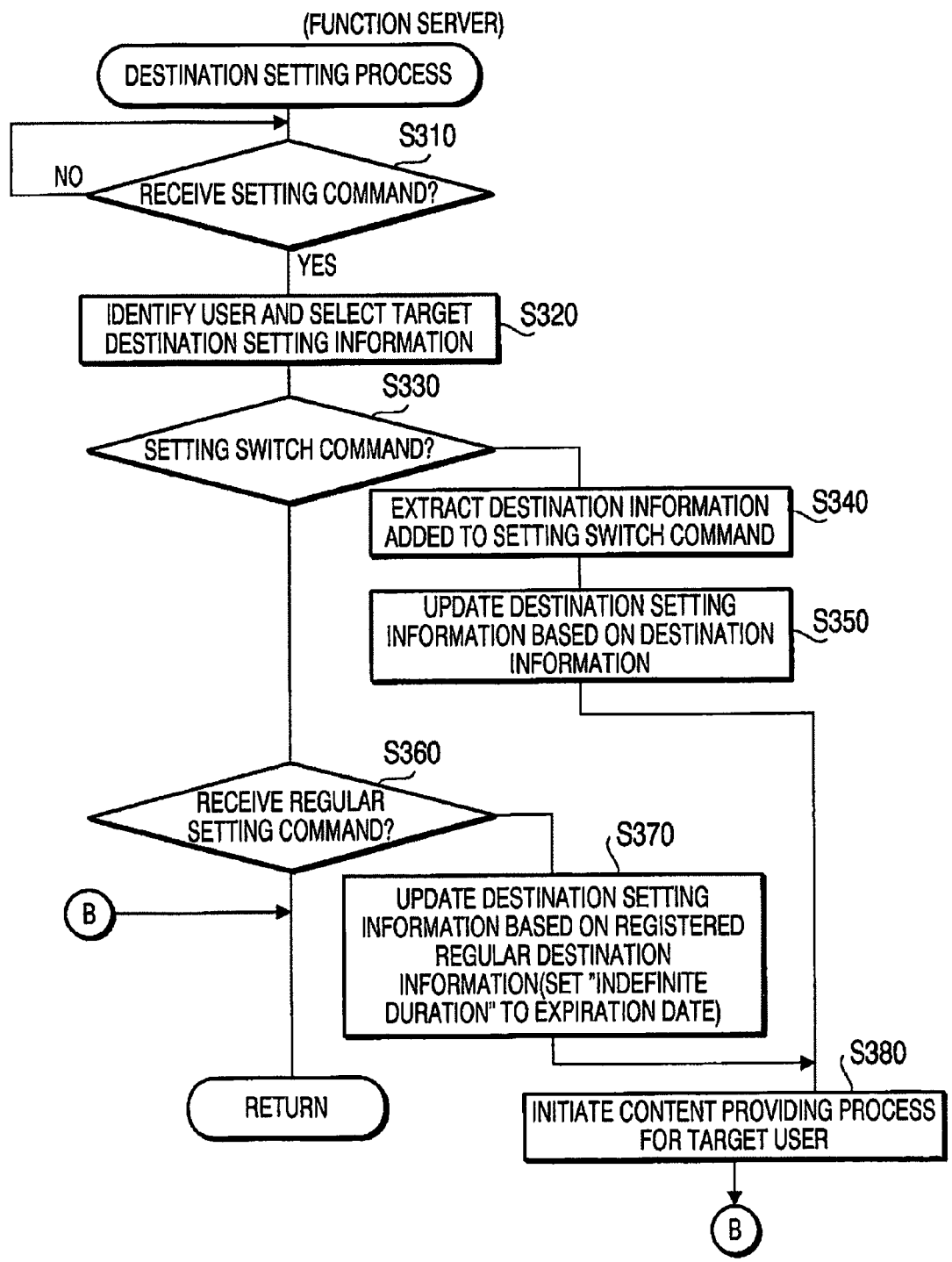
FIG. 7 is a flowchart illustrating a destination setting process executed by the function server according to illustrative aspects of the invention.

FIG. 7 is a flowchart illustrating the destination setting process executed under control of the control unit 11 of the function server 10 to conduct switching of client devices. The destination process is executed repeatedly on the function server 10.

First, the control unit 11 waits until a setting command is transmitted from a client device (the MFP 30 or the facsimile device 50) which is capable of issuing the setting command (S310). If the setting command is received (S310: YES), the control unit 11 identifies a user of a source device which has transmitted the setting command, based on address information of the client device (the source device) and the user ID contained in the received setting command, and selects the destination setting information corresponding to the user as target destination setting information (S320).

Next, the control unit 11 judges whether the setting command is formed as a setting switch command for switching the destination of contents from the regular destination to another client device (S330). If the setting command is formed as the setting switch command (S330: YES), the control unit 11 extracts destination information added to the setting switch command (S340), and updates the target destination setting information based on the extracted destination information (S350).

The destination information added to the setting switch command is configured as shown in FIG. 4A. The control unit 11 assigns the parameter representing the receiving way contained in the extracted destination information to the parameter of the receiving way of the destination setting information, assigns the parameter representing the destination address contained in the extracted destination information to the parameter representing the destination address of the destination setting information, and assigns the parameter representing the reception check mode contained in the extracted destination information to the parameter representing the reception check mode of the destination setting information.

If the parameter representing the receiving way of the destination setting information is "web", the control unit 11 assigns a URL, which is assigned in advance to the user (identified in step S320), to the parameter representing the receiving way of the destination setting information. After step S350 is processed as mentioned above, control proceeds to step S380.

If it is judged in step S330 that the received setting command is not formed as the setting switch command (S330: NO), the control unit 11 judges whether the setting command is formed as a regular setting command for switching the destination back to the regular destination (S360). If the setting command is not the regular setting command (S360: NO), the control unit 11 ends the destination setting process, assuming that unknown command is received.

If the received setting command is the regular setting command (S360: YES), the control unit 11 changes the current destination of the contents of the target destination setting information back to the regular destination, based on the regular destination information of the target user stored in the storage unit 13 (S370). Then, the control unit 11 initiates the content providing process (FIG. 9) for the user identified in step S320. Then, the destination setting process terminates.

In the above mentioned destination setting process, the control unit 11 updates the destination setting information when the regular setting command is inputted to change the destination of the contents from the current destination back to the regular destination. Alternatively or additionally, the control unit 11 may be configured to be able to automatically change the destination of contents from the current destination back to the regular destination if the expiration date is set for the destination setting information and the expiration date is reached.

Figure 8:
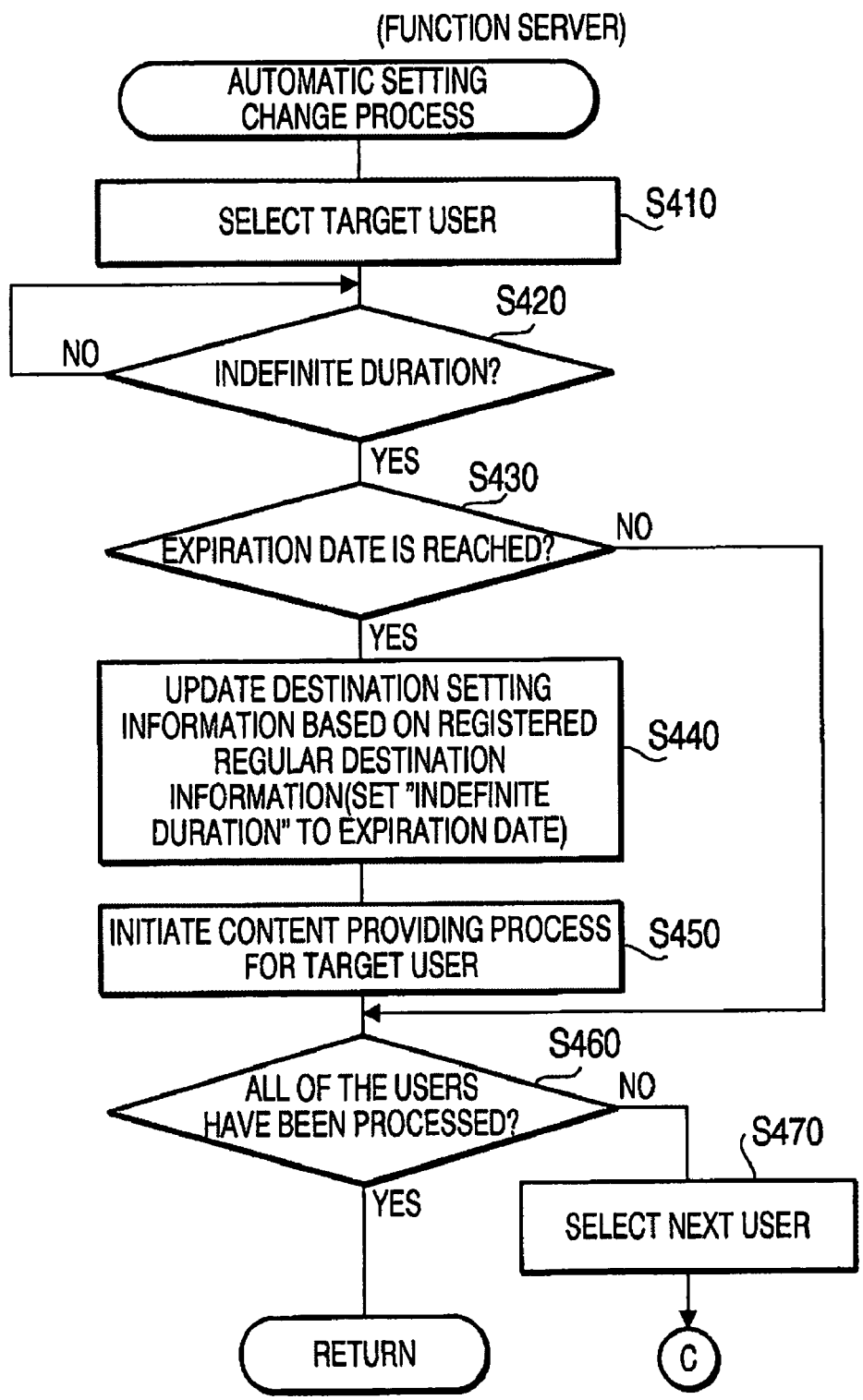
FIG. 8 is a flowchart illustrating an automatic setting change process executed by the function server according to illustrative aspects of the invention.

FIG. 8 is a flowchart illustrating the automatic setting change process executed under control of the control unit 11 of the function server 10 to automatically change a destination of contents from a current setting to a regular destination.

First, the control unit 11 selects one of users from the customer information, as a target user, and reads the user's user information from the customer information (S410). Then, the control unit 11 judges whether the parameter representing the expiration date of the destination setting information contained in the user's user information is a parameter representing the indefinite duration (S420).

If the parameter of the expiration date is equal to the indefinite duration (S420: YES), control proceeds to step S460. If the parameter of the expiration date is not equal to the indefinite duration (i.e., the parameter of the expiration date represents time information) (S420: NO), the control unit 11 judges whether the time indicated by the parameter of the expiration date (i.e., the expiration date of the destination) is reached.

If the expiration date is not reached (S430: NO), control proceeds to step S460. If the expiration date is reached (S430: YES), control proceeds to step S440 where the control unit 11 updates the destination setting information to change the destination of contents from the current destination back to the regular destination as in the case of step S130 or S370.

After step S440 is processed, the control unit 11 initiates the content providing process (FIG. 9) for the target user (S450). Next, in step S460, the control unit 11 judges whether all of the users registered in the customer information have been processed. If all of the uses have not been processed (S460: NO), the control unit 11 selects one of unprocessed users from the customer information, as a next target user. Then, control returns to step S420. If all of the users have been processed (S460: YES), the automatic setting change process terminates.

Figure 9:
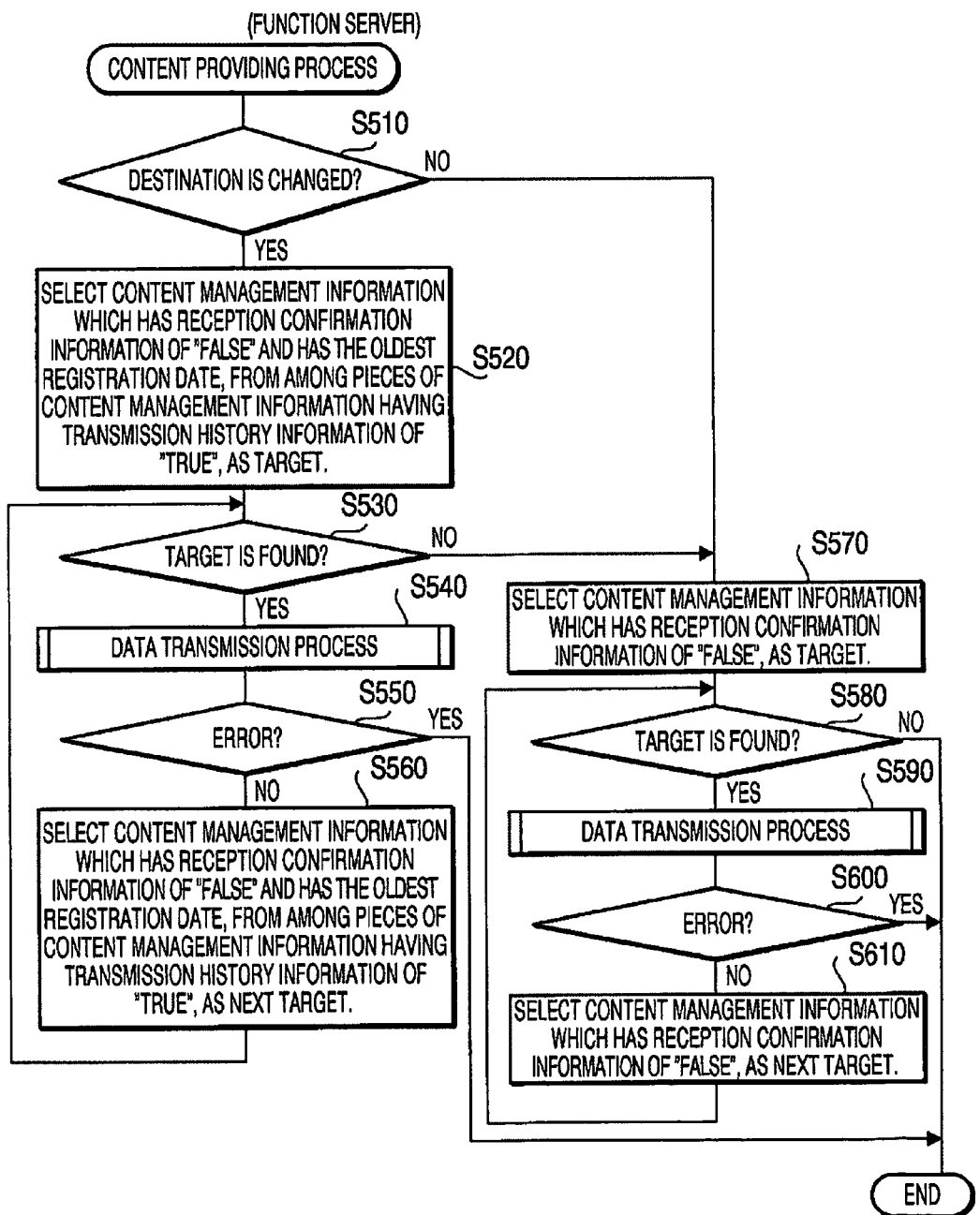
FIG. 9 is a flowchart illustrating a content providing process executed by the function server according to illustrative aspects of the invention.

Hereafter, the content providing process to be initiated in step S260, S380 or S450 will be explained with reference to FIG. 9. The content providing process is executed under control of the control unit 11 of the function server 10.

First, the control unit 11 judges whether a factor causing the execution of the content providing process is the change of the destination of contents. If the factor is the change of the destination of contents (i.e., the content providing process is initiated in step S380 or S450) (S510: YES), control proceeds to step S520. If the factor is not the change of the destination of contents (i.e., the content providing process is initiated in step S260) (S510: NO), control proceeds to step S570.

In step S520, the control unit 11 selects a piece of content management information which has the reception confirmation information of "FALSE" and has the oldest registration date, from among pieces of content management information having the transmission history information of "TRUE" stored in the management table of the target user, as target content management information. If a selection target is not found (S530: NO), control proceeds to step S570. If the selection target is found (S530: YES), control proceeds to step S540.

In step S540, the control unit 11 executes the data transmission process (FIG. 10) for the target content management information so as to transmits the contents corresponding to the target content management information to the client device indicated by the destination in the destination setting information of the target user. With regard to the contents which were successfully transmitted, the transmission history information in the content management information corresponding to the contents is changed to "TRUE", as described in detail later.

After step S540 is processed, the control unit 11 judges whether an error is detected in the data transmission process (see S741) executed in step S540. If an error is detected in the data transmission process (S550: YES), the content providing process terminates.

If an error is not detected in the data transmission process (S550: NO), the control unit 11 selects a piece of content management information which has the reception confirmation information of "FALSE" and has the second oldest registration date, from among pieces of content management information having the transmission history information of "TRUE" stored in the management table of the target user, as next target content management information. If a next selection target is found (S530: YES), steps from S540 are processed.

If the next target is not found (S530: NO), control proceeds to step S570. In step S570, the control unit 11 selects a piece of content management information which has the transmission history information of "FALSE" and has the oldest registration date, from among pieces of content management information stored in the management table of the target user, as target content management information. If such a selection target is not found (S580: NO), the content providing process terminates. If the selection target is found (S580: YES), control proceeds to step S590.

In step S590, the control unit 11 executes the data transmission process so as to transmit the contents corresponding to the target content management information, to the client device corresponding to the destination indicated by the transmission setting information of the target user. With regard to the contents successfully transmitted, the control unit 11 changes the transmission history information of the content management information corresponding to the contents, to "TRUE", as described in detail later.

After step S50 is processed, control proceeds to step S600. In step S600, the control unit 11 judges whether an error is detected in the data transmission process executed in step S590. if an error is detected in the data transmission process (S600: YES), the content providing process terminates.

If an error is not detected in the data transmission process (S600: NO), control proceeds to step S610. In step S610, the control unit 11 selects a piece of content management information which has the transmission history information of "FALSE" and has the second oldest registration date, from among pieces of content management information stored in the management table of the target user, as next target content management information. If such a selection target is found, steps from S590 are executed. If the section target is not found (S580: NO), the content providing process terminates.

Figure 10:
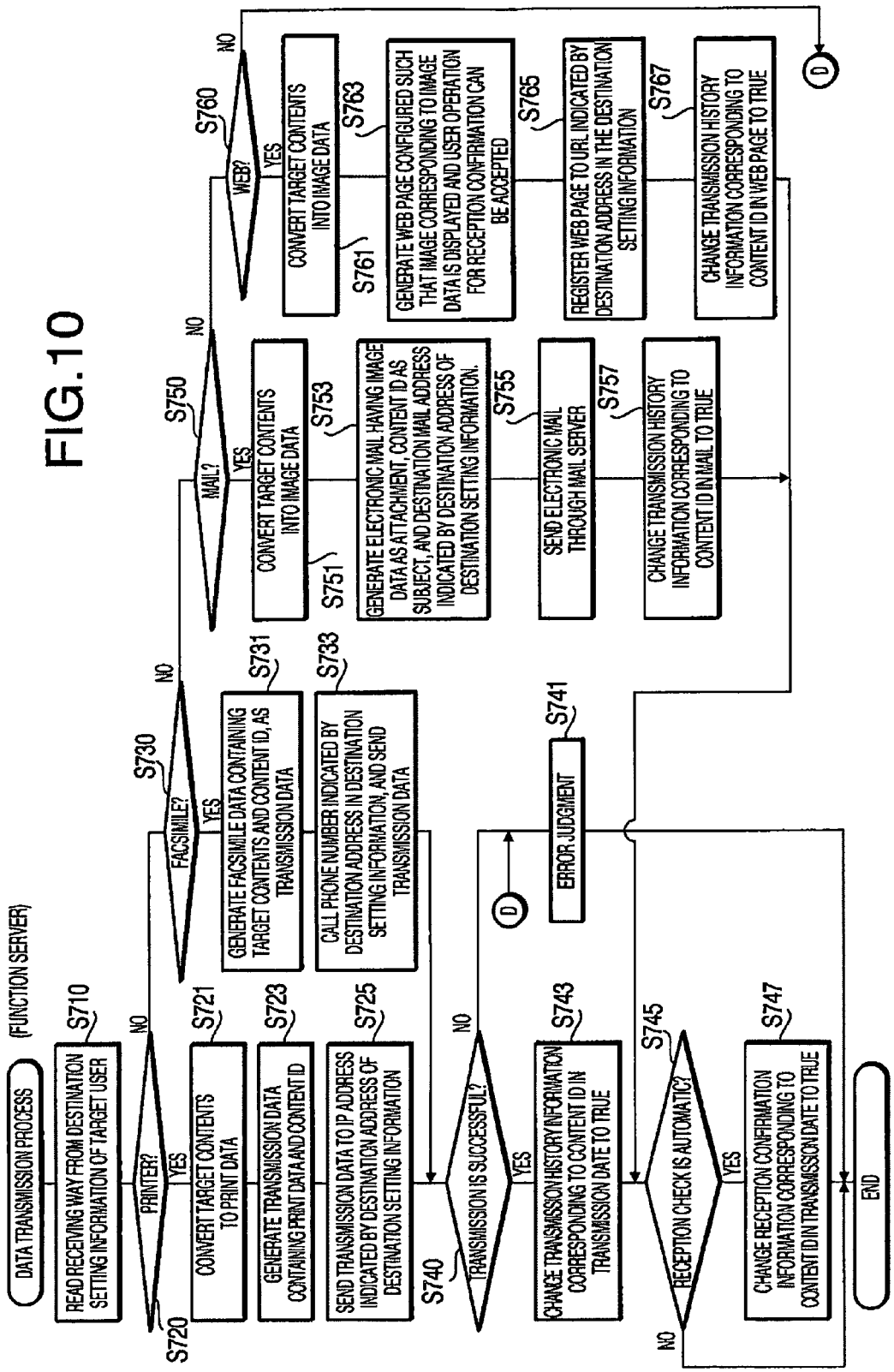
FIG. 10 is a flowchart illustrating a data transmission process executed by the function server according to illustrative aspects of the invention.

Hereafter, the data transmission process executed in step S540 or S590 under control of the control unit 11 of the function server 10 will be explained with reference to FIG. 10. First, the control unit 11 reads the parameter representing the receiving way in the destination setting information of the target user (S710). The, the control unit 11 judges whether the receiving way is "printer" (S720).

If the receiving way is "printer" (S720: YES), the control unit 11 reads transmission target contents from the storage unit 13, and converts the contents to print data which the MFP 10 is able to receive via the Internet 3 (S721). Then, the control unit 11 generates transmission data containing the print data and the content ID assigned to the transmission target contents (S723).

Next, the control unit 11 sends the transmission data to an IP address corresponding to the destination in the transmission setting information of the target user via the Internet 3, so that the transmission data is provided to the client device having the IP address (S725). Then, control proceeds to step S740.

If it is judged in step S720 that the receiving way is not "printer" (S720: NO), control proceeds to step S730 where the control unit 11 judges whether the receiving way in the destination setting information of the target user is "facsimile". If the receiving way is "facsimile" (S730: YES), the control unit 11 generates facsimile data containing transmission target contents and a content ID assigned to the transmission target contents, as transmission data. The facsimile data formed as data which the facsimile device 50 is able to print out.

Next, the control unit 11 initiates facsimile communication with the facsimile device 50 having a phone number indicated by the destination address in the destination setting information of the target user (S733). Then, control proceeds to step S740. Specifically, when the facsimile communication is initiated, the control unit 11 calls the facsimile device 50 having the phone number via the modem 17, communicates with the facsimile device 50, and provides the transmission data for the connected facsimile device 50.

In step S740, the control unit 11 judges whether the transmission is successfully finished. If the data transmission is not successfully finished (S740: NO), control proceeds to step S741. If the data transmission successfully finished (S740: YES), control proceeds to step S743.

Specifically, the control unit 1 judges that the data transmission is successfully finished if the control unit 11 receives a reception notification (S1130) sent by the MFP 30 as a response signal after transmitting the transmission data via the Internet 3 in step S725, while the control unit 1 judges that the data transmission is not successfully finished if the control unit 11 does not receive the reception notification.

The control unit 11 judges that the data transmission is successfully finished if the facsimile communication (S733) is successfully finished, while the control unit 11 judges that the data transmission is not successfully finished if the facsimile communication (S733) is not successfully finished.

If the judgment result of S740 is "NO", control proceeds to step S741 where the control unit 11 makes a decision on an error. If the judgment result of S740 is "YES", control proceeds to step S743 where the control unit 11 changes the transmission history information, which corresponds to the content ID stored in the transmission data and is stored in the management table of the target user, to "TRUE".

After step S743 is processed, the control unit 11 judges whether the reception check mode in the destination setting information of the target user is "automatic" (S745). If the reception check mode is not "automatic" (S745: NO), the data transmission process terminates. If the reception check mode is "automatic" (S745: YES), control proceeds to step S747 where the control unit 11 changes the reception check mode, which corresponds to the content ID stored in the transmission data and is stored in the management table of the target user, to "TRUE". Then, the data transmission process terminates.

If it is judged in step S730 that the receiving way in the destination setting information of the target user is not "facsimile" (S730: NO), control proceeds to step S750. In step S750, the control unit 11 judges whether the receiving way in the destination setting information of the target user is "mail". If the receiving way is "mail" (S750: YES), the control unit 11 converts the transmission target contents to image data having a certain format such as a JPEG and GIF (S751).

Next, the control unit 11 generates an electronic mail having a destination address equal to the destination indicated in the destination setting information of the target user, a reply address equal to its own mail address (hereafter, referred to as a reception check mail address), a subject equal to the content ID of the transmission target contents, and an attachment data equal to the image data generated as above.

Next, the control unit 11 sends the generated electronic mail to the destination address via the mail server program (SMTP server program) (S755). Then, the control unit 11 changes the transmission history information, which corresponds to the content ID set as the subject of the electronic mail and is stored in the management table of the target user, to "TRUE" (S757).

After step S757 is processed, control proceeds to step S745. In step S745, the control unit 11 judges whether the reception check mode in the destination setting information of the target user is "automatic". If the reception check mode is not "automatic" (S745: NO), the data transmission process terminates. If the reception check mode is "automatic" (S745: YES), control unit 11 changes the reception check mode, which corresponds to the content ID stored in the transmission data (electronic mail) and is stored in the management table of the target user, to "TRUE" (S747). Then, the data transmission process terminates.

If it is judged in step S750 that the receiving way in the destination setting information of the target user is not "mail" (S750: NO), control proceeds to step S760. In step S760, the control unit 11 judges whether the receiving way in the destination setting information of the target user is "web". If the receiving way is not "web" (S760: NO), control proceeds to step S741.

If the receiving way is "web" (760: YES), control proceeds to step S761 where the control unit converts the transmission target contents to image data having a certain format such as JPEG or GIF. Next, the control unit 11 generates a web page configured such that an image represented by the image data is displayed on a client device accessing the web page. More specifically, the web page contains the content ID and enables the client device (a web browser of the client device) accessing the web page to send the content ID stored in the web page to the function server 30 when a user conducts a reception confirmation operation through the web browser (S763).

Figure 11A:
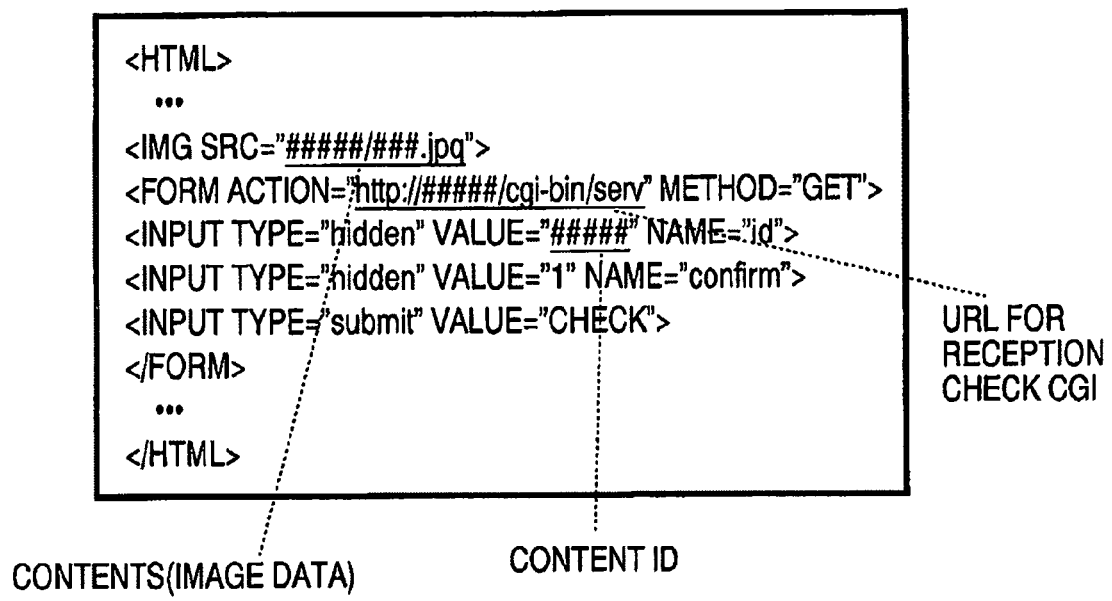
FIG. 11A is an example of a source list of a web page generated in the data transmission process according to illustrative aspects of the invention.
Figure 11B:
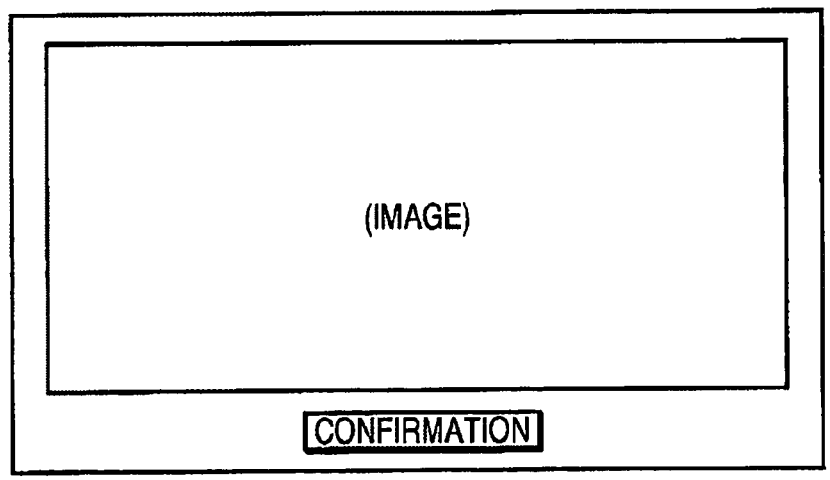
FIG. 11B is an example of a screen generated from the source list of FIG. 11A according to illustrative aspects of the invention.

FIG. 11A is an example of a source list of a web page generated in step S763, and FIG. 11B is an example of a screen generated according to the source list of FIG. 11A. As shown in FIGS. 11A and 11B, a confirmation button is located under the image generated in step S761, on the web page. If the confirmation button is selected, the content ID is send to a URL of a reception check CGI (Common Gateway Interface). That is, if a user conducts an operation for confirming reception of the contents by selecting the confirmation button on the user's device, the content ID of the contents is sent from the user's device to the function server 10.

After step S763 is processed, the control unit 11 registers the generated web page in a URL corresponding to the destination in the destination setting information of the target user (S765). Then, the control unit 11 changes the transmission history information, which corresponds to the content ID stored in the web page registered in the URL and is stored in the management table of the target user, to "TRUE" (S767).

After S767 is processed, control proceeds to step S745. In step S745, the control unit 11 judges whether the reception check mode in the destination setting information of the target user is "automatic". If the reception check mode is not "automatic" (S745: NO), the data transmission process terminates. If the reception check mode is "automatic" (S745: YES), control unit 11 changes the reception check mode, which corresponds to the content ID stored in the registered data (the web page) and is stored in the management table of the target user, to "TRUE" (S747). Then, the data transmission process terminates.

Figure 12:
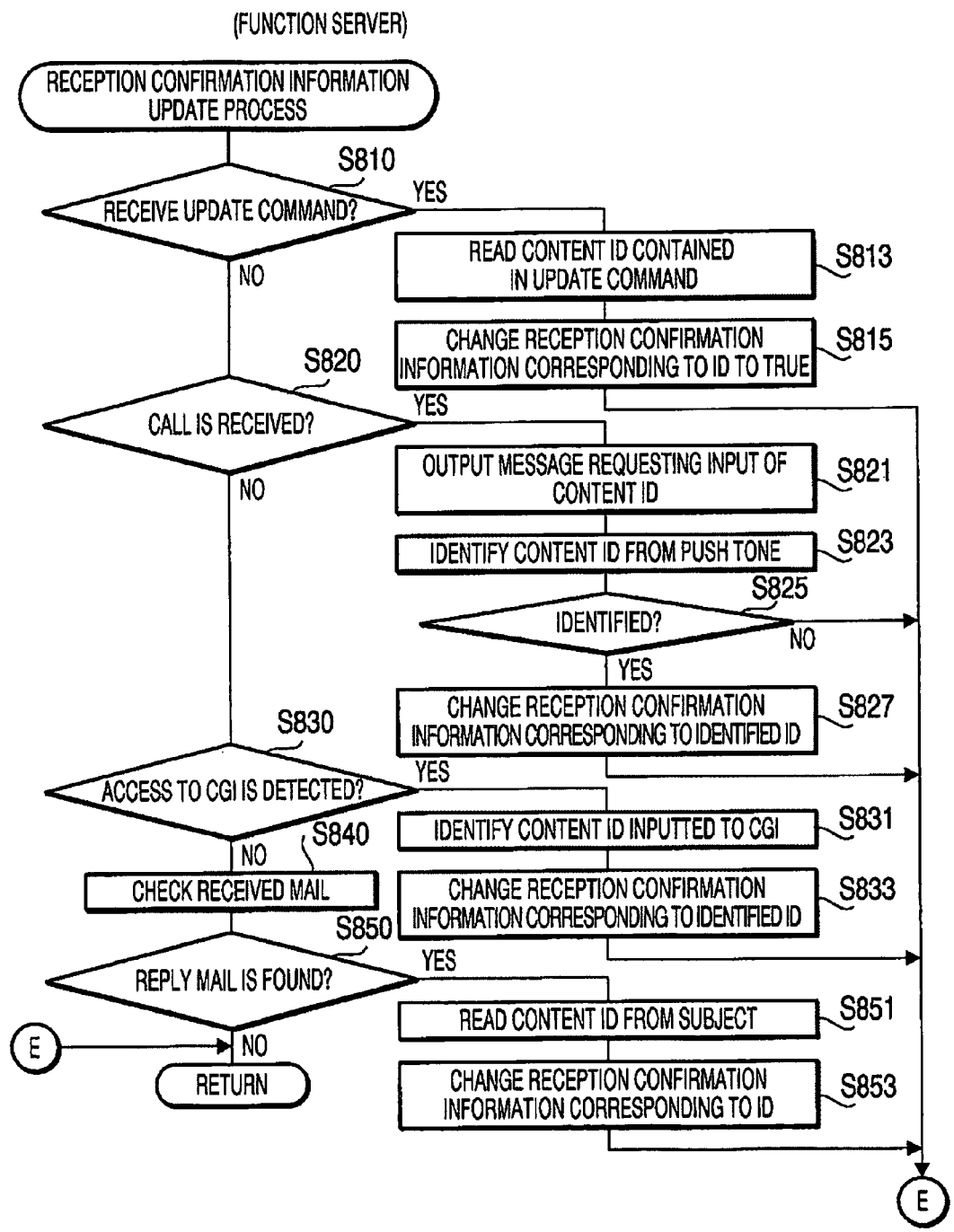
FIG. 12 is a flowchart illustrating a reception confirmation information update process executed by the function server according to illustrative aspects of the invention.

Hereafter, the reception confirmation information update process executed repeatedly under control of the control unit 11 of the function server will be explained with reference to FIG. 12. The reception confirmation information update process is executed to change the reception confirmation information in the management table to "TRUE".

First, the control unit 11 judges whether an update command is received from a client device (e.g., the MFP 30), which is configured to be capable of outputting an update command, via the Internet 3 and the communication unit 15 (S810). If the update command is received (S810: YES), the control unit 11 reads out a content ID added to the update command (S813). Then, the control unit 111 changes the reception confirmation information corresponding to the content ID, to "TRUE" (S815).

It should be noted that a unique content ID is generated for each content item to be transmitted, and the content ID is notified only to a user who has conducted a operation for confirming reception of the contents. Therefore, in step S815, the reception confirmation information to be targeted is identified only from the content ID, and the reception confirmation information is changed to "TRUE". After step S815 is processed, the reception confirmation information update process terminates, and thereafter the process starts from S810.

If it is judged in step S810 that the update command is not received from the client device (S810: NO), control proceeds to step S820 where the control unit 11 judges whether the modem 17 of the function server 10 receives a call. If a call is received (S820: YES), the control unit 11 established a connection with a calling telephone, and sends a message for requesting a user to input of a content ID of contents (of which reception is confirmed), to the calling telephone (S821).

Next, the control unit 11 waits an input of push tone for a predetermined time. If push tone is inputted, the control unit 11 identifies the content ID of the contents of which reception has been confirmed by the user (S823). If the identification is successfully finished (S825: YES), the control unit 11 changes the reception confirmation information corresponding to the content ID to "TRUE" (S827). Then, the reception confirmation information update process terminates, and thereafter the process starts from S810.

If the identification is not successfully finished (due to the fact that inappropriate pushing operation are conducted by the user, for example) (S825: NO), the reception confirmation information update process terminates, and thereafter the process starts from S810.

If it is judged in step S820 that the modem 37 does not receive the call (S820: NO), control proceeds to step S830 where the control unit 11 judges whether access to the reception check CGI (see FIG. 11A) has been made via the Internet 3. If the access to the reception check CGI has been made (S830: YES), the control unit 11 identifies a content ID (of which reception is confirmed by the user on the user's device) inputted to the CGI (S831). Then, the control unit 11 changes the reception confirmation information corresponding to the content ID to "TRUE" (S833). Then, the reception confirmation information update process terminates, and thereafter the process starts from S810.

If it is judged in step S830 that the access to the reception check CGI has not been made (S830: NO), control proceeds to step S840 where the control unit 11 makes a check on received mails addressed to the reception check mail address (S840). Next, the control unit 11 judges whether a reply mail to the electronic mail transmitted in step S755 is found in the newly received mails addressed to the reception heck mail address (S850).

If a reply mail is found (S850: YES), the control unit 11 obtains the content ID from the subject of the reply mail (S851). Then, the control unit 11 changes the reception confirmation information corresponding to the obtained content ID, to "TRUE" (S853). Then, the reception confirmation information update process terminates. If the reply mail is not found (S850: NO), the reception confirmation information update process terminates without processing steps S851 and S853.

Figure 13:
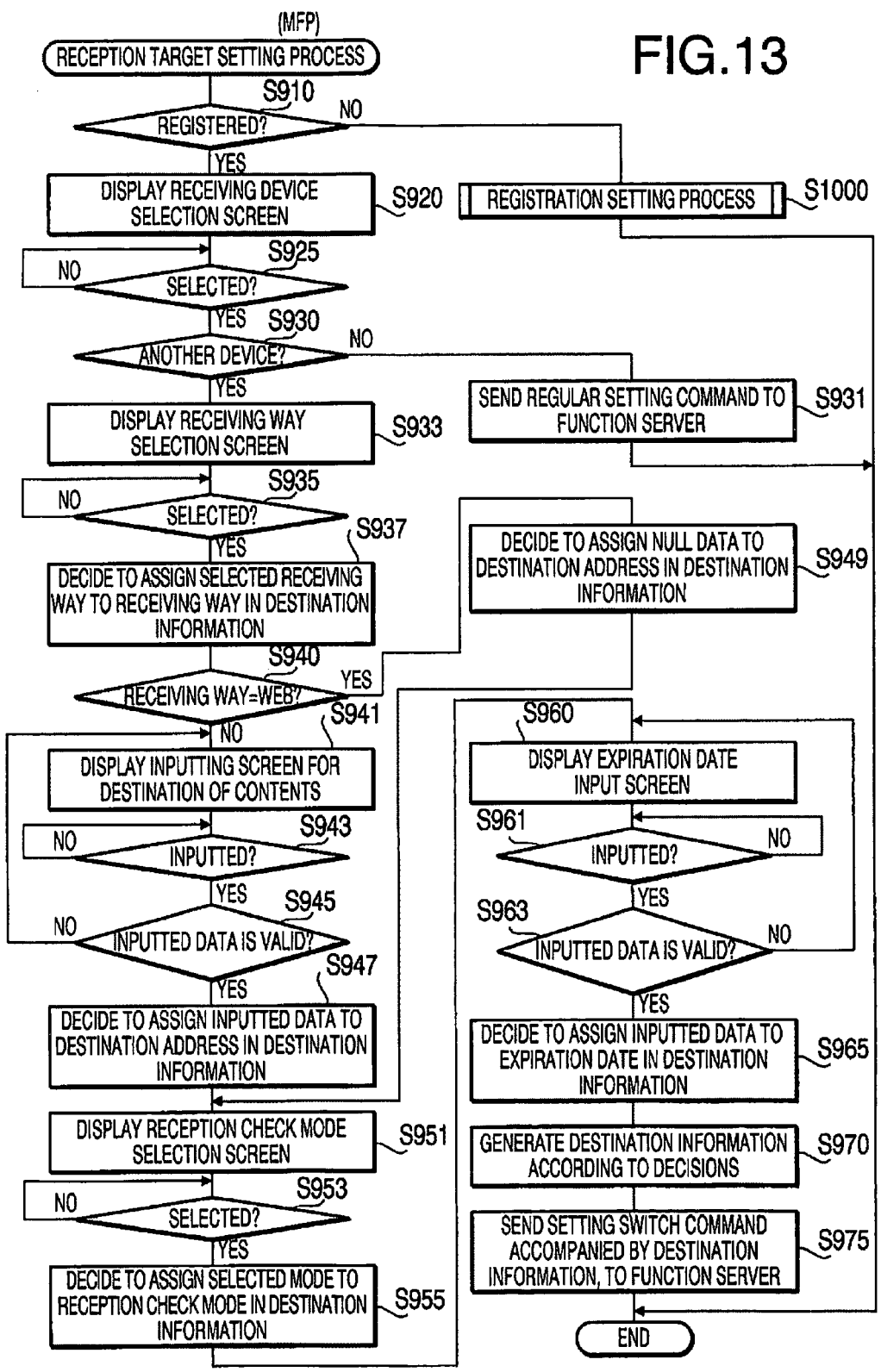
FIG. 13 is a flowchart illustrating a reception target setting process executed by a MFP provided in the content providing system according to illustrative aspects of the invention.

Hereafter, operations of the MFP 30 will be described. As described above, the MFP 30 is configured to transmit the registration command, setting switch command, and regular setting command to the function server 10 via the Internet 3. FIG. 13 is a flowchart illustrating a reception target setting process executed under control of the control unit 31 of the MFP 30 when a reception target is inputted to the MFP 10 by a user.

When the reception target setting process is started, the control unit 31 judges whether a user registration for the MFP 30 has been conducted (S910). Specifically, the control unit 31 judges that the user registration has not been conducted when the reception target setting process is executed for the first time (S910: NO), while the control unit judges that the user registration has been conducted for (or after) the second time execution of the reception target setting process (S910: YES).

Figure 14:
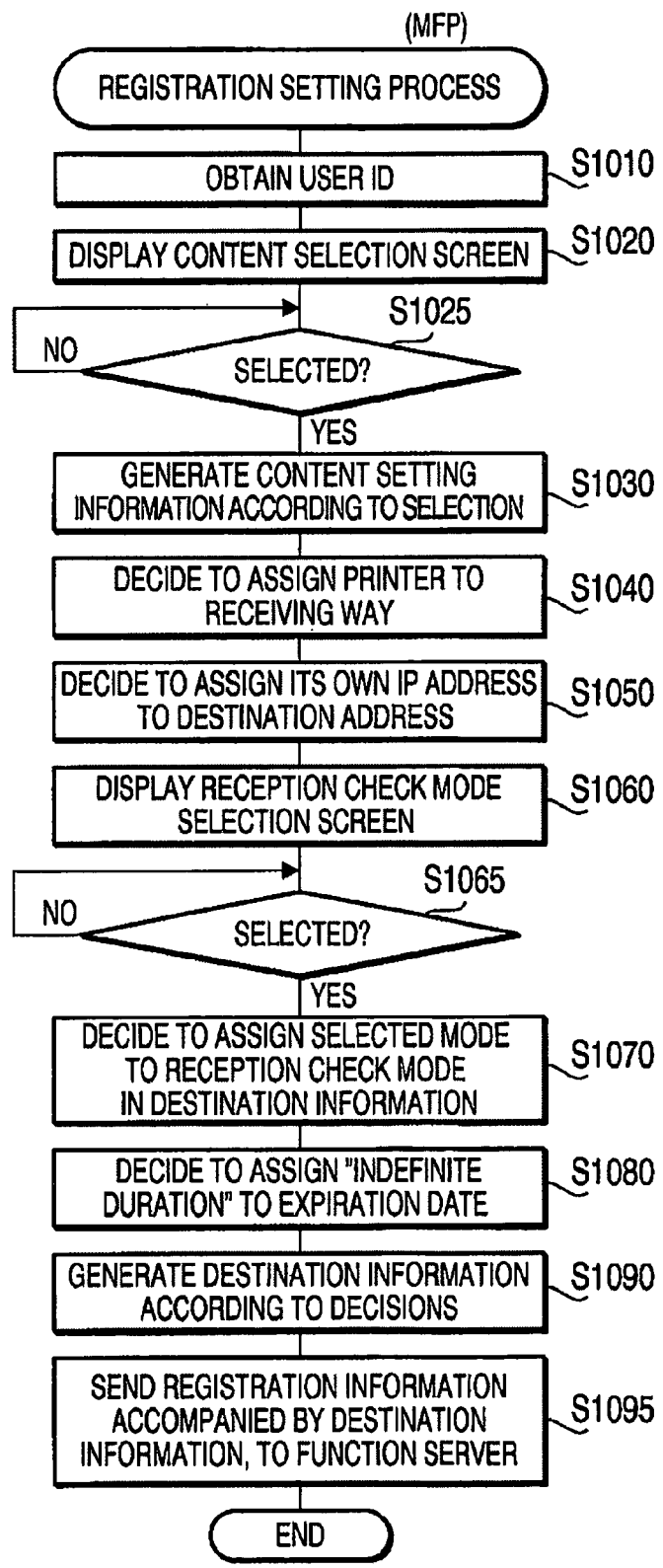
FIG. 14 is a flowchart illustrating a registration setting process executed by the MFP according to illustrative aspects of the invention.

If the user registration has not been conducted (S910: NO), a registration setting process is executed (S1000). FIG. 14 is a flowchart illustrating the registration setting process executed under control of the control unit 31 of the MFP 30.

Referring now to FIG. 14, when the registration setting process is started, the control unit 31 obtains a user ID (S1010). The control unit 31 may obtain the user ID by requesting a user to input the user ID via the operation unit 32 or by reading the user ID from the storage unit 36 in which user IDs are preprogrammed before shipment.

After step S1010 is processed, the control unit 31 displays a content selection screen for requesting a user to select a content item from more than one content items which the function server 10 is able to provide, on the display unit 39 (S1020). Next, the control unit 31 waits until the user selects a content item using the operation unit 32 (S1025). If the user selection is made (S1025: YES), the control unit 31 generates content setting information in accordance with the user selection conducted through the content selection screen (S1030).

Next, the control unit 31 decides the parameter of the receiving way to be stored in the destination information as "printer" (S1040). Then, the control unit 31 decides the parameter of the destination address to be stored in the destination information as its own IP address (S1050). Then, control proceeds to step S1060 where the control unit 31 displays a reception check mode selection screen on the display unit 39.

Figure 15A:
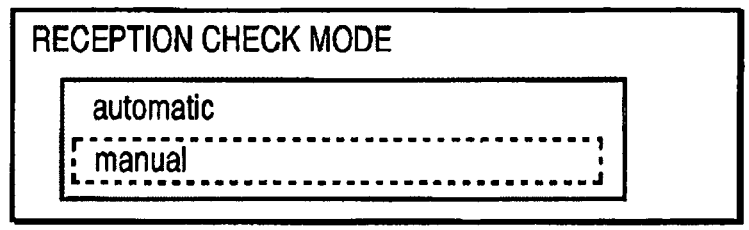
FIG. 15A illustrates a reception check mode selection screen displayed on a display unit of the MFP according to illustrative aspects of the invention.

FIG. 15A illustrates the reception check mode selection screen displayed on the display unit 39. As shown in FIG. 15A, the reception check mode selection screen is configured such that the user is able to select one of items "automatic" and "manual" as the reception check mode. After the reception check mode selection screen is displayed, the user select one of "automatic" and "manual" using the operation unit 32.

After the reception check mode selection screen is displayed, the control unit 31 waits until the user selects one of "automatic" and "manual" through the reception check mode selection screen (S1065: NO). If the user selection is made (S1065: YES), the control unit 31 decides to assign the selected mode ("automatic" or "manual") to the parameter of the reception check mode to be stored in the destination information (S1070).

After step S1070 is processed, the control unit 31 decides to assign the value representing the indefinite duration to the parameter of the expiration date of the destination to be stored in the destination information (S1080). Next, the control unit 31 generates the destination information in accordance with the decisions mentioned above (S1090). After step S1090 is processed, the control unit 31 adds the destination information to the registration command, and transmits the registration command accompanied by the destination information, to the function server 10. Then, the registration setting process terminates, and the reception target setting process also terminates. As described above, the function server executes steps S120 and S130 after receiving the registration command.

Figure 15B:
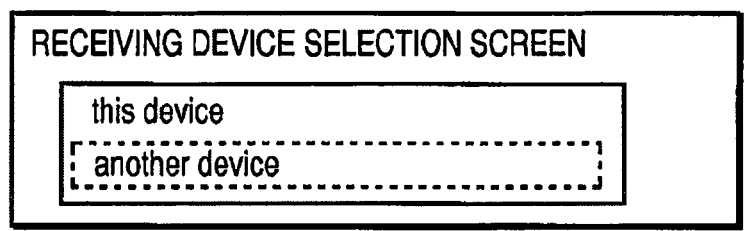
FIG. 15B illustrates an example of a receiving device selection screen according to illustrative aspects of the invention.

Referring back to FIG. 13, if it is judged in step S910 that the user registration has been made (S910: YES), control proceeds to step S920 where the control unit 31 displays a receiving device selection screen on the display unit 39. FIG. 15B illustrates an example of the receiving device selection screen. As shown in FIG. 15B, the receiving device selection screen is configured such that the user is able to select a device which the user wants to be receive the contents, from among devices listed on the screen as selectable items ("this device" and "another device"). After the receiving device selection screen is displayed, the user selects the item "this device" if the user wants to receive the contents on the MFP 30, while the user selects the item "another device" if the user wants to receive the contents on devices (e.g., facsimile device 50 or another MFP 30) other than the MFP 30 being used by the user.

After step S920 is processed, the control unit 31 waits until the user selects one of "this device" and "another device" (S925: NO). If a user selection is made (S925: NO), the control unit 31 judges whether the user selects "another device" (S930). If the user does not select "another device" (S930: NO), the control unit 31 sends the regular setting command to the function server 10 (S931). Then, the reception target setting process terminates. As described above, the function server 10 executes steps S370 and S380 after receiving the regular setting command.

Figure 15C:
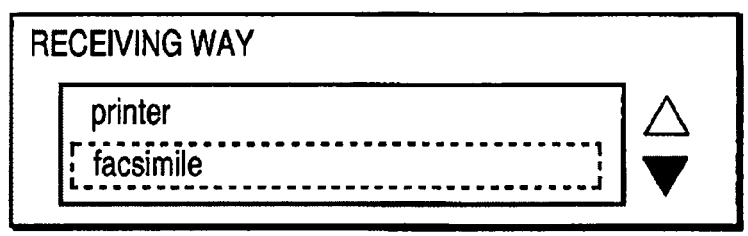
FIGS. 15C and 15D are examples of a receiving way selection screen displayed on the display of the MFP according to illustrative aspects of the invention.
Figure 15D:
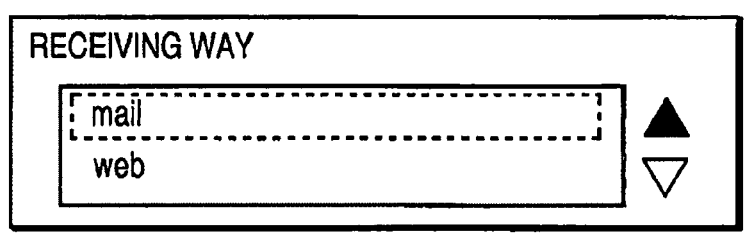

If it is judged in step S930 that the selected device is "another device" (S930: YES), the control unit 31 displays a receiving way selection screen on the display unit 39 (S933). FIGS. 15C and 15D are examples of the receiving way selection screen to be displayed on the display unit 39. As shown in FIGS. 15C and 15D, the receiving way selection screen is configured such that the user is able to select a receiving way from among selectable items of "printer", "facsimile", "mail" and "web", and the user is able to scroll up or down the selectable items by using triangular buttons arranged on the right side of the screen. After the receiving way selection screen is displayed, the user is able to designate the receiving way for "another device" the operation unit 32.

After step S933 is processed, the control unit 31 waits until the user selects one of the items through the receiving way selection screen (S935: NO). If a user selection is made through the receiving way selection screen (S935: YES), the control unit 31 decides to assign the selected receiving way to the parameter of the receiving way to be stored in the destination information (S937). Then, the control unit 31 judges whether the selected receiving way is "web" (S940).

Figure 15E:
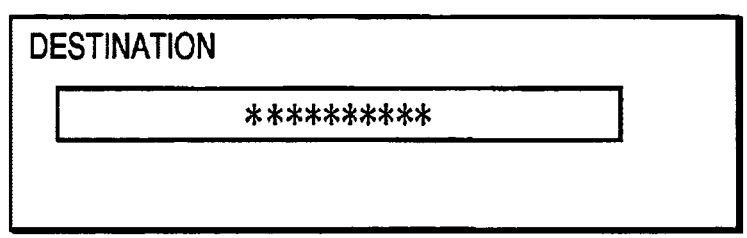
FIG. 15E illustrates an example of an inputting screen displayed on the display of the MFP according to illustrative aspects of the invention.

If the selected receiving way is not "web" (S940: NO), the control unit 31 displays an inputting screen for requesting the user to input a destination of contents, on the display unit 39 (S941). FIG. 15E illustrates an example of the inputting screen displayed on the display unit 39.

After step S941 is processed, the control unit 31 waits until the user inputs information about the destination of contents through the inputting screen (S943: NO). If the user input is accepted through the inputting screen (S943: YES), the control unit 31 judges whether the information inputted by the user is valid (S945). Specifically, the control unit 31 judges that the inputted information (the destination of contents) is valid if the inputted information meets the receiving way designated thorough the receiving way selection screen, while the control unit 31 judges that the inputted information (the destination of contents) is not valid if the inputted information does not meet the receiving way designated thorough the receiving way selection screen.

For example, the control unit 31 judges that the inputted information is valid (S945: YES) if the receiving way is "printer" and if an IP address is inputted as the information of the destination, while the control unit 31 judges that the inputted information is not valid (S945: NO) if the receiving way is "printer" and if information different from an IP address is inputted as the information of the destination. The control unit 31 judges that the inputted information is valid (S945: YES) if the receiving way is "facsimile" and if a phone number is inputted as the information of the destination, while the control unit 31 judges that the inputted information is not valid (S945: NO) if the receiving way is "facsimile" and if information different from a phone number is inputted as the information of the destination. The control unit 31 judges that the inputted information is valid (S945: YES) if the receiving way is "mail" and if a mail address is inputted as the information of the destination, while the control unit 31 judges that the inputted information is not valid (S945: NO) if the receiving way is "mail" and if information different from a mail address is inputted as the information of the destination.

If it is judged that the inputted information of the destination is not valid (S945: NO), control returns to step S941 to display the inputting screen again and to request the user to input information of the destination of contents again. If the inputted information of the destination is valid (S945: YES), the control unit 31 decides to assign the inputted information to the parameter of the destination address to be stored in the destination information (S947). Then, control proceeds to step S951.

If it is judged in step S940 that the selected receiving way is "web" (S940: YES), control proceeds to step S949 where the control unit 31 decides to assign null data to the parameter of the destination address to be stored in the destination information (S947). Then, control proceeds to step S951.

In step S951, the control unit 31 displays the reception check mode selection screen shown in FIG. 15A. Then, the control unit 31 waits until the user selects one of "automatic" and "manual" (S953: NO). If the user selects one of "automatic" and "manual" (S953: YES), the control unit 31 decides to assign the selected mode to the parameter of the reception check mode to be stored in the destination information (S955). Then, control proceeds to step S960.

Figure 15F:
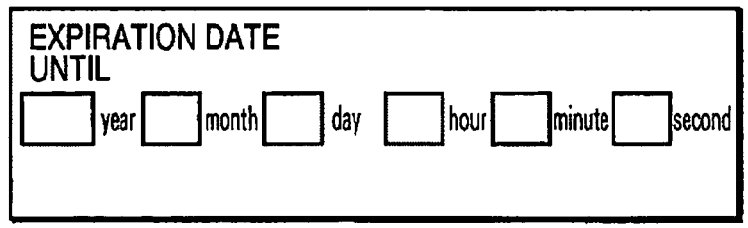
FIG. 15F illustrates an example of an expiration date input screen displayed on the display of the MFP according to illustrative aspects of the invention.

In step S960, the control unit 31 displays an expiration date input screen on the display unit 39. FIG. 15F illustrates an example of the expiration date input screen displayed on the display unit 39. As shown in FIG. 15F, the expiration date input screen is configured such that the user is able to input year, month, day, hour, minute and second as the expiration date of the destination.

After step S960 is processed, the control unit 31 waits until the user inputs the expiration date using the operation unit 32 (S961: NO). If the user input is conducted (S961: YES), the control unit 31 judges whether the inputted expiration date is valid (S963). Specifically, the control unit 31 judges that the inputted expiration date is valid if the inputted expiration date is later than the current date, while the control unit 31 judges that the inputted expiration date is not valid if the inputted expiration date is earlier than the current date.

If the inputted expiration is not valid (S963: NO), control returns to step S960 to display the expiration date input screen again and to request the user to input a proper expiration date. If the inputted expiration date is valid (S963 YES), the control unit 31 decides to assign the inputted expiration date to the parameter of the expiration date of the destination to be stored in the destination information (S965). Then, control proceeds to step S970.

In step S970, the control unit 31 generates the destination information in accordance with the decisions mentioned above. Next, the control unit 31 adds the destination information to the setting switch command, and sends the setting switch command accompanied by the destination information to the function server 10 (S975). Then, the reception target setting process terminates. As described above, the function server 10 executes steps S340, S350 and S380 after receiving the setting switch command.

Hereafter, a reception and print process executed repeatedly under control of the control unit 31 of the MFP 30 will be explained with reference to FIG. 16.

First, the control unit 31 waits until the transmission data containing the print data and the content ID is transmitted from the function server 10 (S1110: NO). If the transmission data is received (S1110: YES), the control unit 31 registers the print data contained in the received data in a print job (S1120). The recording unit 34 of the MFP 30 is configured to print pieces of print data registered in the print job sequentially in order of occurrence. Therefore, the pieces of print data registered in the print job in step S1120 are printed sequentially by the recording unit 34.

After step S1120 is processed, the control unit 31 sends the reception notification to the function server 10 (S1130). As described above, the reception notification is used by the function server 10 in step S740.

Then, the control unit 31 registers reception history information which contains a reception date of the received data and the content ID corresponding to the received print data (S1140), in a reception history table. Then, the reception and print process terminates, and thereafter the control unit 31 waits until next data is received (S1110).

Figures 16, 17:
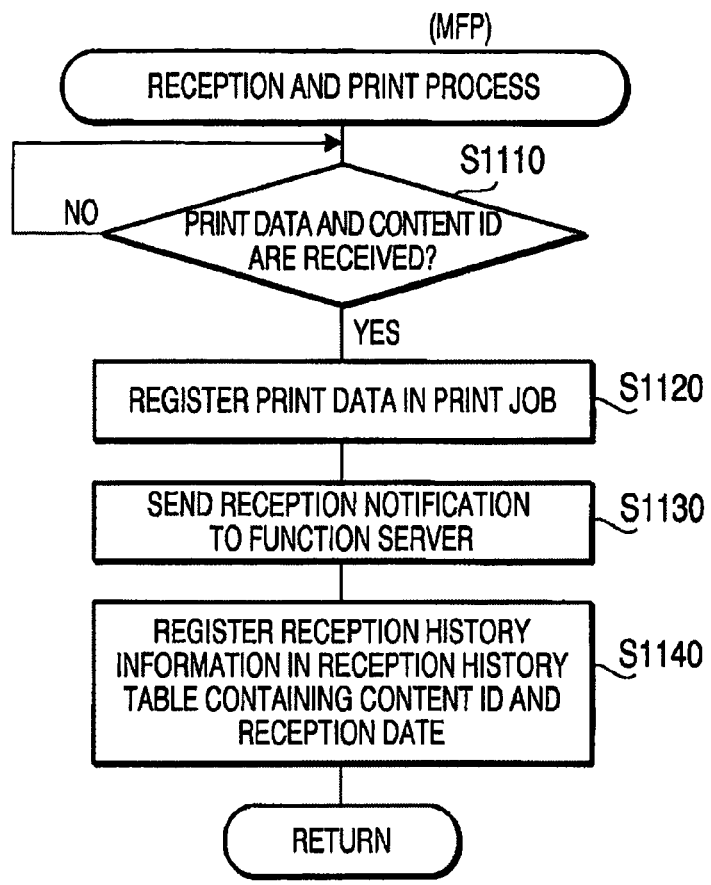
FIG. 16 is a reception and print process executed by the MFP according to illustrative aspects of the invention.
FIG. 17 is an example of a data structure of a reception history table according to illustrative aspects of the invention.

FIG. 17 is an example of a data structure of the reception history table stored in the storage unit 36. As shown in FIG. 17, one or more pieces of reception history information (each including the content ID and the reception date) are registered in the reception history table in order of occurrence.

Figure 18:
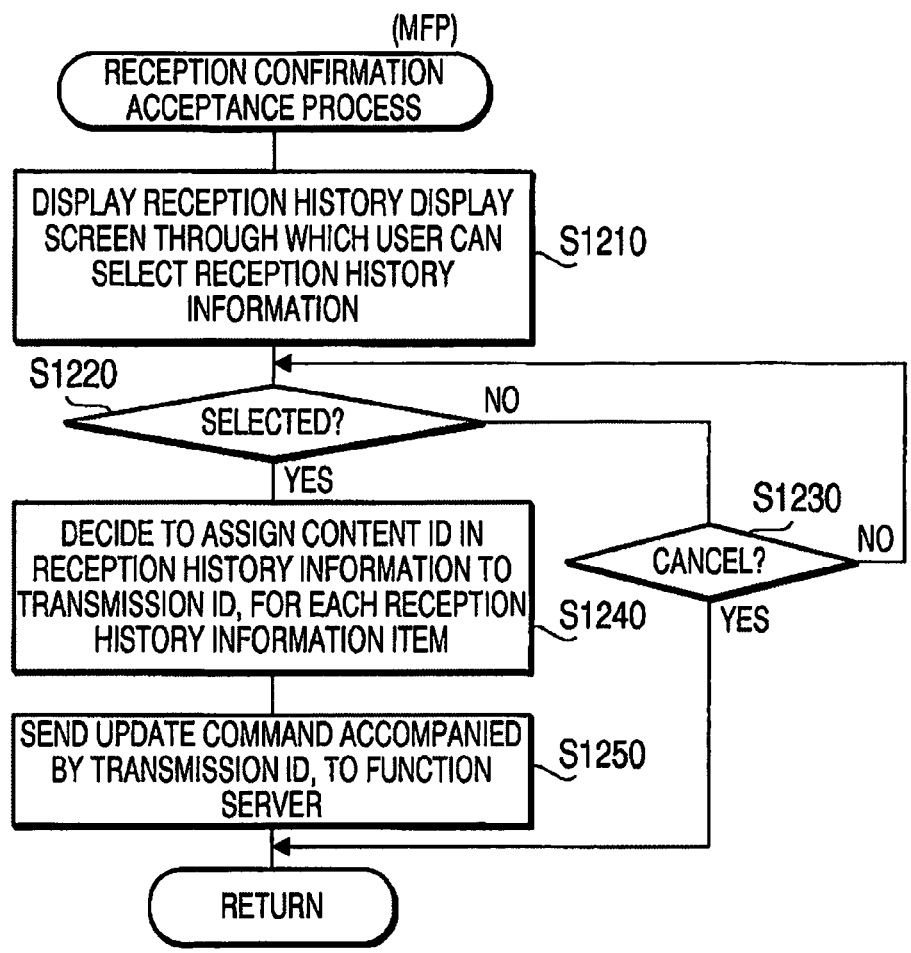
FIG. 18 is a flowchart illustrating a reception confirmation acceptance process executed by the MFP according to illustrative aspects of the invention.

Hereafter, a reception confirmation acceptance process executed under control unit 31 of the MFP 30 will be explained with reference to FIG. 18. The reception confirmation acceptance process is executed when a reception history display command is inputted by a user to the MFP 10 through use of the operation unit 32.

Figure 19:
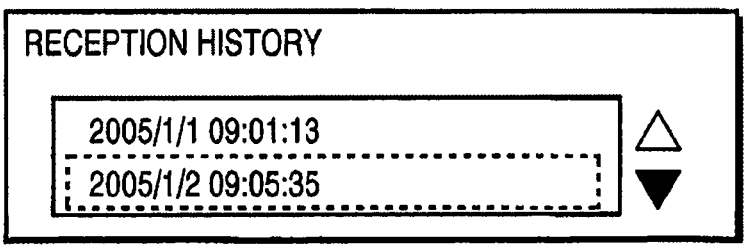
FIG. 19 illustrates an example of a reception history display screen displayed on the display of the MFP according to illustrative aspects of the invention.

First, the control unit 31 displays a reception history display screen on the display unit 39 (S1210). FIG. 19 illustrates an example of the reception history display screen displayed on the display unit 39. As shown in FIG. 19, on the reception history display screen, reception dates of the pieces of reception history information are listed in order of occurrence. The reception history display screen is configured such that the user is able to scroll up or downs the reception dates by using triangular buttons arranged on the right side of the screen, and that the user is able to select one or more of the reception dates using the operation unit 32.

After step S1210 is processed, the control unit 31 judges whether one or more of the reception dates are selected (S1220). If a user selection has not been made through the reception date display screen (S1220: NO), the control unit 31 judges whether a cancellation command requesting the MFP 30 to close the reception date display screen has been inputted (S1230).

If the cancellation command has not been inputted (S1230: NO), control returns to step S1220 to wait until a reception date is selected or the cancellation command is inputted. If the cancellation command has been inputted (S1230: YES), the reception confirmation acceptance process terminates.

If the user selection has been made through the reception date display screen (S1220: YES), the control unit 31 decides to assign the content IDs of the pieces of reception history information corresponding to the selected one or more reception dates, to transmission IDs (S1240). Then, the control unit 31 sends an update command containing the transmission IDs, to the function server 10 (S1250). Then, the reception confirmation acceptance process terminates. As described above, the function server 10 changes the reception confirmation information of the corresponding content item to "TRUE" (see S813 and S815) when the function server 10 receives the update command.

Each facsimile device 50 is configured to be capable of executing the reception target setting process (FIG. 13) and the registration setting process (FIG. 14). When these processes are executed by the facsimile device 50, the facsimile device 50 sends the registration command, the regular setting command and the setting switch command to the function server 10 via the PSTN 5, decides to assign "facsimile" to the parameter of the receiving way to be stored in the destination information in step S1040, and decides to assign its own phone number to the parameter of the destination address to be stored in the destination information.

The facsimile device 50 configured as mentioned above is able to register itself in the function server 10 as a regular destination device (a client device), to receive the contents in a facsimile data format, and to print the received contents.

As described above, according to the content providing system 1, the function ser 10 executes the content providing process (FIG. 9) each time a predetermined condition is satisfied so as to intermittently provide contents for a client device designated by the destination setting information.

If the function server 10 receives the registration command accompanied by the destination information (see FIG. 4A) representing a destination of contents via a network (S110: YES), the function server 10 registers the parameter of the receiving way contained in the destination information, the parameter of the destination address and the parameter of the reception check mode, in the storage unit 13 as the regular destination information.

By setting the regular destination information to the destination setting information (S130), the function server 10 intermittently provides contents for the client device indicated by the regular destination information.

If the function server 10 receives the setting switch command accompanying the destination information via a network (S330: YES), the function server 10 assigns the destination information contained in the setting switch command to the destination setting information for a predetermined time period so that the function server 10 provides contents for a client device indicated by the destination information contained in the setting switch command in place of providing the contents to a client device indicated by the regular destination information.

If the predetermined time period has elapsed, the function server 10 sets the regular destination information to the destination setting information so that the providing of contents to the client device indicated by the destination information accompanied by the setting switch information is terminated, and the providing of the contents to the regular destination is started again.

Therefore, according to the content providing system 1, a user is able to change a destination of contents temporarily from the regular destination to another device during trip or business travel by sending the setting switch command to the function server 10 from the user's own device (MFP 30 or the facsimile device 50) via a network.

According to the content providing system 1, the function server 10 changes the destination of contents back to the regular destination in accordance with the regular destination information stored in the storage unit 13 after the predetermined time period has elapsed, without requesting the user to input again the address of a pre-switching client device (previously set by the user as a client device to be supplied with the contents) (S370, S440). In such a configuration, the user is not required to input again the address (an IP address or a phone number) of the original destination device to change the destination of contents from a client device, which the user tentatively uses at a place where the user is staying, to the original client device. It is understood that such a configuration enables the user to easily change a destination of contents to receive contents on another device tentatively.

In the content providing system 1, if the function server 10 receives the setting switch command, the function server 10 provides contents for the client device indicated by the destination information contained in the setting switch command until the function server 10 receives the regular setting command, in place of providing the contents for the regular destination. If the function server 10 receives the regular setting command (S360: YES), the function server 10 stops to provide contents to the client device indicated by the destination information and changes the destination of contents back to the regular destination (S370), so that the providing of contents is restarted for the regular destination (S380).

Therefore, according to the embodiment, the user is only required to input a command (the regular setting command) to change the destination of contents back to the regular destination. That is, the user is able to change the destination of contents back to the regular destination at a desirable time.

In the content providing system 1, when the expiration date of the destination contained in the setting switch command is reached (S430: YES), the function server 10 stops to provide contents for the client device indicated by the destination information contained in the setting switch command, and changes the destination of contents back to the regular destination (S440), so that the providing of contents is restarted for the regular destination (S450). Such a configuration enables the user to receive contents on the client device corresponding to the regular destination after the expiration date is reached, without requesting a user to conduct a user operation after the user has inputted the setting switch command.

In the content providing system 1, the user is able to set a desirable date to the expiration date through the expiration date input screen (see FIG. 15F) displayed on the user's client device corresponding to the regular destination (e.g., the MFP 30 or the facsimile device 50). Such a configuration enables user to cause the function server 10 to change the destination of contents back to the regular destination at a desirable time, without requesting the user to operate the function server 10 after the user inputs the setting switch command.

In the content providing system 1, the function server 10 converts the format of contents to be provided to a client device into a certain format acceptable to the client device, based on the parameter of the receiving way contained in the destination setting information. Such a configuration enables the user to receive contents on various types of client devices which the user would use at travel destinations.

In the content providing system 1, after the function server 10 changes the destination of contents to the regular destination, the function server 10 searches the management table of the target user to select content items having the reception confirmation information of "FALSE" from among content items which has been provided for the client device. Then, the function server 10 judges that the selected content items need to be provided for the client device (S520, 8560), so that the contents of the selected content items are provided to the client device (S540).

Therefore, according to the content providing system 1, contents are prevented from being become undelivered to the user due to the fact that the contents are printed out on a device (which the user uses at a travel destination) after the user returns from the business travel and before the destination of contents is changed back to the regular destination. That is, it is possible to provide a device (which the user uses at a travel destination) with the same contents as those which have printed by a device (which the user uses before the business travel).

According to the content providing system 1, undesired contents are prevented from being delivered to the user (being printed by the regular destination device) because the function server 10 judges whether re-offering of contents is necessary for each of the content items. Such an advantage is emphasized when the contents are printed on recording medium (e.g., sheets of paper) by a client device having the recording function (e.g. the MFP 30 and the facsimile device 50) because the above mentioned configuration of the embodiment reduces the consumption of recording medium.

In the content providing system 1, when the user conducts an operation for confirming reception of contents through use of the operation unit 32, a content ID corresponding to the contents is notified from the client device to the function server 10. After the function server is notified of the content ID (S813, S823, S831, S851), the function server 10 changes the reception confirmation information corresponding to the content ID in the user's management table, to TRUE, so that the contents corresponding to the content ID are removed from targets of the data transmission process (S540). Therefore, according to the content providing system 1, undesired contents are prevented reliably from being delivered to the user.

In the content providing system 1, when the function server 10 receives a setting switch command while the function server 10 provides contents to a client device (which is used in place of the regular destination device) corresponding to destination information contained in the setting switch command, the function server 10 updates the destination setting information based on the destination information contained in the newly received setting switch command (S350), so that the providing of contents to the previous client device are stopped and the providing of contents is restarted for the newly designated client device (S380).

In this case, the function server 10 searches the management table of the target user so as to select content items having the reception confirmation information of "FALSE" from among content items which have been already provided for the client device, and to judge that the selected content items need to be provided for the newly designated client device (S520, S560). The contents of the selected content items are provided for the newly designated client device (S540).

Therefore, in a situation where a user moves to many locations during his/her travel, the user is able to receive contents, which is the same as those which have been printed by a device at the first location of his/her travel, on a device at the second location of the travel.

What is claimed is:

1. A server for successively providing content to a predetermined client, comprising:
    a registration unit that stores first destination information representing a first destination of offering of content in a memory, if said registration unit receives a command for registration accompanied by said first destination information;
    a content providing unit that provides content to a client device corresponding to said first destination information stored in said memory, wherein said content comprises at least one content item; and
    a switched content providing unit that operates to switch offering of content by said content providing unit from said first destination of offering of content to a second destination of offering of content for a predetermined time period, if said switched content providing unit receives a command for switching that includes second destination information representing said second destination of offering of content, to provide said content, which would have been provided for the first destination if offering of content was not switched, to a client device corresponding to said second destination of offering of content by said content providing unit, and to switch offering of content from said client device corresponding to said second destination of offering of content if said predetermined time period has elapsed, back to said first destination of offering
    of content,
    wherein:
    the server includes a judgment unit that judges whether it is necessary to provide each content item, which the switched content providing unit has provided to the client device corresponding to the second destination, to the client device corresponding to the first destination;
    the judgment unit judges that it is necessary to provide each content item to the client device corresponding to the first destination when the client device corresponding to the second destination was not able to receive each content item; and
    the content providing unit provides newly generated content, which was not provided by the switched content providing unit to the client device corresponding to the second destination and which has not been provided for the first destination of offering of content, to the client device corresponding to the first destination after the switched content providing unit switches back to said first destination of offering of content, and to provide only each content item, which the judgment unit judged it is necessary to provide to the client device corresponding to the first destination and which is selected from the content provided for the second destination of offering of content, to the client device corresponding to the first destination,
    wherein when the switched content providing unit receives a command for switching, the switched content providing unit extracts the second destination information representing the second destination of offering of content from the command for switching.

2. The server according to claim 1, wherein:
    if the switched content providing unit receives the command for switching, the switched content providing unit operates to stop offering of contents by the content providing unit, and to provide contents to the client device corresponding to the second destination information until the switched content providing unit receives a command for releasing; and
    if the switched content providing unit receives the command for releasing, the switched content providing unit operates to stop offering of contents to the client device corresponding to the second destination information, and to restart the offering of contents by the content providing unit.

3. The server according to claim 1, wherein:
    if the switched content providing unit receives the command for switching, the switched content providing unit operates to stop offering of contents by the content providing unit, and to provide contents to the client device corresponding to the second destination information until a predetermined time is reached; and
    if the predetermined time is reached, the switched content providing unit operates to stop offering of contents to the client device corresponding to the second destination information, and to restart the offering of contents by the content providing unit.

4. The server according to claim 3, wherein:
    the command for switching is accompanied by a switch end time defined by a source device of the command for switching;
    if the switched content providing unit receives the command for switching, the switched content providing unit operates to stop offering of contents by the content providing unit, and to provide contents to the client device corresponding to the second destination information until the switch end time is reached; and
    if the switch end time is reached, the switched content providing unit operates to stop offering of contents to the client device corresponding to the second destination information, and to restart the offering of contents by the content providing unit.

5. The server according to claim 1, further comprising a conversion unit that converts a data format of contents to a format acceptable to a target client device which receives the contents from the server.

6. The server according to claim 5, wherein the conversion unit converts the contents into print data for a printing device if the target client device is the printing device.

7. The server according to claim 5, wherein the conversion unit converts the contents into facsimile data for a facsimile device if the target client device is the facsimile device.

8. The server according to claim 1, wherein:
    the judgment unit judges whether it is necessary to provide contents, which the switched content providing unit has provided to the client device corresponding to the second destination information, to a client device corresponding to third destination information representing a destination of offering of contents accompanying a command for switching which is newly received while the switched content providing unit stops offering of contents by the content providing unit;
    if the switched content providing unit receives the new command for switching while the switched content providing unit stops offering of contents by the content providing unit, the switched content providing unit operates:

to stop an operation thereof based on the command for switching already received;

to provide contents, which the judgment unit judges that it is necessary to provide the contents to the client device corresponding to the third destination information accompanying the newly received command for switching, to the client device corresponding to the third destination information;

to provide contents, newly generated after receiving the new command for switching, to the client device corresponding to the third destination information in place of the content providing unit during a certain time period from stoppage of the operation thereof;

to stop offering of contents when the certain time period has elapsed; and to restart offering of contents by the content providing unit.

9. The server according to claim 8, further comprising an obtaining unit that obtains necessity information indicating whether it is necessary to provide each content item, which the switched content providing unit has provided to the client device, to the client device corresponding to the third destination information, from an operation unit which a user is able to operate, wherein the judgment unit judges whether it is necessary to provide each content item, which the switched content providing unit has provided to the client device corresponding to the second destination information, to the client device corresponding to the third destination information, in accordance with the necessity information obtained by the obtaining unit, if the new command for switching is received while the switched content providing unit stops offering of contents by the content providing unit.

10. A system for providing contents, comprising:

a server for successively providing content to a predetermined client, comprising:

a registration unit that stores first destination information representing a first destination of offering of content in a memory, if said registration unit receives a command for registration accompanied by said first destination information;

a content providing unit that provides content to a client device corresponding to said first destination information stored in said memory, wherein said content comprises at least one content item; and a switched content providing unit that operates to switch offering of content by said content providing unit from said first destination of offering of content to a second destination of offering of content for a predetermined time period, if said switched content providing unit receives a command for switching that includes second destination information representing said second destination of offering of content, to provide said content, which would have been provided for the first destination if offering of content was not switched, to a client device corresponding to said second destination of offering of content by said content providing unit, and to switch offering of content from said client device corresponding to said second destination of offering of content if said predetermined time period has elapsed, back to said first destination of offering of content, wherein:

the server includes a judgment unit that judges whether it is necessary to provide each content item, which the switched content providing unit has provided to the client device corresponding to the second destination, to the client device corresponding to the first destination;

the judgment unit judges that it is necessary to provide each content item to the client device corresponding to the first destination when the client device corresponding to the second destination was not able to receive each content item; and the content providing unit provides newly generated content, which was not provided by the switched content providing unit to the client device corresponding to the second destination and which has not been provided for the first destination of offering of content, to the client device corresponding to the first destination after the switched content providing unit switches back to said first destination of offering of content, and to provide only each content item, which the judgment unit judged it is necessary to provide to the client device corresponding to the first destination and which is selected from the content provided for the second destination of offering of content, to the client device corresponding to the first destination, wherein when the switched content providing unit receives a command for switching, the switched content providing unit extracts the second destination information representing the second destination of offering of content from the command for switching.

11. The system according to claim 10, wherein:

the at least one client device is configured to transmit the command for registration and the command for switching, to the server, and to transmit information representing its own device as the destination of contents to the server when transmitting the command for registration.

12. A method for successively providing contents to a predetermined client, comprising the steps of:

storing first destination information representing a destination of offering of contents in a memory, as a regular destination of contents, if a command for registration accompanied by the first destination information is received;

providing contents to a client device corresponding to the regular destination stored in the memory, wherein said contents comprise at least one content item;

stopping offering of contents to the client device corresponding to the regular destination for a predetermined time period if a command for switching that includes second destination information representing a destination of offering of contents is received;

providing contents, which would have been provided for the regular destination if offering of contents was not switched, to a client device corresponding to the second destination information;

stopping offering of contents to the client device corresponding to the second destination information if the predetermined time period has elapsed;

restarting the offering of contents to the client device corresponding to the regular destination;

judging whether it is necessary to provide each content item, which was provided to the client device corresponding to the second destination, to the client device corresponding to the regular destination, wherein the judgment unit judges that it is necessary to provide each content item to the client device corresponding to the regular destination when the client device corresponding to the second destination was not able to receive each content item;

providing newly generated contents, which was not provided to the client device corresponding to the second destination, and which has not been provided for the regular destination of offering for contents, to the client device corresponding to the regular destination after restarting the offering of contents; and providing only each content item, which was judged it is necessary to provide to the client device corresponding to the regular destination, to the client device corresponding to the regular destination.

13. A non-transitory computer readable storage medium having a computer program embodied thereon, the computer program being executable by a server which successively provides contents to a predetermined client, to perform the steps of:

storing first destination information representing a destination of offering of contents in a memory, as a regular destination of contents, if a command for registration accompanied by the first destination information is received;

providing contents to a client device corresponding the regular destination stored in the memory, wherein said contents comprise at least one content item;

stopping offering of contents to the client device corresponding to the regular destination for a predetermined time period if a command for switching that includes second destination information representing a destination of offering of contents is received;

providing contents, which would have been provided for the regular destination if offering of contents was not switched, to a client device corresponding to the second destination information;

stopping offering of contents to the client device corresponding to the second destination information if the predetermined time period has elapsed;

restarting the offering of contents to the client device corresponding to the regular destination;

judging whether it is necessary to provide each content item, which was provided to the client device corresponding to the second destination, to the client device corresponding to the regular destination, wherein the judgment unit judges that it is necessary to provide each content item to the client device corresponding to the regular destination when the client device corresponding to the second destination was not able to receive each content item;

providing newly generated contents, which was not provided to the client device corresponding to the second destination, to the client device corresponding to the regular destination after restarting the offering of contents; and providing only each content item, which was judged it is necessary to provide to the client device corresponding to the regular destination, to the client device corresponding to the regular destination.

* * * * *